US009086562B2

United States Patent
Hosoi et al.

(10) Patent No.: US 9,086,562 B2
(45) Date of Patent: Jul. 21, 2015

(54) ZOOM LENS AND IMAGE PICKUP UNIT

(71) Applicant: Sony Corporation, Tokyo (JP)

(72) Inventors: Masaharu Hosoi, Kanagawa (JP); Toshihiro Sunaga, Kanagawa (JP)

(73) Assignee: Sony Corporation, Tokyo (JP)

( * ) Notice: Subject to any disclaimer, the term of this patent is extended or adjusted under 35 U.S.C. 154(b) by 51 days.

(21) Appl. No.: 13/777,363

(22) Filed: Feb. 26, 2013

(65) Prior Publication Data
US 2013/0242166 A1    Sep. 19, 2013

(30) Foreign Application Priority Data

Mar. 19, 2012  (JP) .................................. 2012-061678

(51) Int. Cl.
| G03B 13/00 | (2006.01) |
| H04N 5/232 | (2006.01) |
| G02B 15/14 | (2006.01) |
| G02B 15/173 | (2006.01) |
| G02B 27/64 | (2006.01) |

(52) U.S. Cl.
CPC .............. G02B 15/14 (2013.01); G02B 15/173 (2013.01); G02B 27/646 (2013.01)

(58) Field of Classification Search
CPC ..... G02B 15/173; G02B 15/14; G02B 27/646
USPC .............................. 348/240.99, 345; 359/686
See application file for complete search history.

(56) References Cited

U.S. PATENT DOCUMENTS

| 7,557,852 | B2 * | 7/2009 | Hashimoto et al. ............ 348/335 |
| 2005/0122595 | A1 * | 6/2005 | Nurishi .......................... 359/684 |
| 2006/0221464 | A1 * | 10/2006 | Shibayama et al. ........... 359/690 |
| 2008/0212201 | A1 * | 9/2008 | Sato .............................. 359/687 |
| 2010/0265594 | A1 * | 10/2010 | Matsui et al. .................. 359/682 |
| 2011/0102908 | A1 * | 5/2011 | Murayama ..................... 359/687 |
| 2011/0116174 | A1 * | 5/2011 | Suzuki et al. .................. 359/687 |
| 2011/0267504 | A1 * | 11/2011 | Ichikawa ..................... 348/240.3 |
| 2011/0285896 | A1 * | 11/2011 | Mihara .......................... 348/345 |
| 2011/0292252 | A1 * | 12/2011 | Mihara ........................ 348/240.1 |
| 2012/0062770 | A1 * | 3/2012 | Eguchi ........................ 348/240.3 |
| 2012/0086821 | A1 * | 4/2012 | Yasutomi et al. ........... 348/208.4 |
| 2012/0188647 | A1 * | 7/2012 | Tanaka et al. ................. 359/601 |
| 2012/0212835 | A1 * | 8/2012 | Kimata et al. ................ 359/693 |
| 2013/0021677 | A1 * | 1/2013 | Kubota ......................... 359/686 |
| 2013/0169856 | A1 * | 7/2013 | Misaka ......................... 348/345 |

FOREIGN PATENT DOCUMENTS

| JP | 04-296809 | 10/1992 |
| JP | 2002-365549 | 12/2002 |

* cited by examiner

*Primary Examiner* — Antoinette Spinks
(74) *Attorney, Agent, or Firm* — Fishman Stewart Yamaguchi PLLC

(57) ABSTRACT

A zoom lens includes: first to fourth lens groups having positive, negative, positive, and negative refractive power, respectively. The first to fourth lens groups are arranged in order from the object plane. The fourth lens group is configured of one negative lens or a cemented lens including positive and negative lenses that are arranged in order from object plane and are attached to each other. A magnification-varying operation from wide end to telephoto end causes the first and third lens groups to travel toward the object plane and causes the second and fourth lens groups to travel along an optical axis. A focusing operation causes the fourth lens group to travel along the optical axis. The following conditional expression is satisfied:

$$0.7 < (R4f + R4r)/(R4f - R4r) < 5 \quad (1)$$

where $R4f$ and $R4r$ are radiuses of curvature of a most-object-sided and a most-image-sided optical surfaces, respectively, in the fourth lens group.

9 Claims, 26 Drawing Sheets

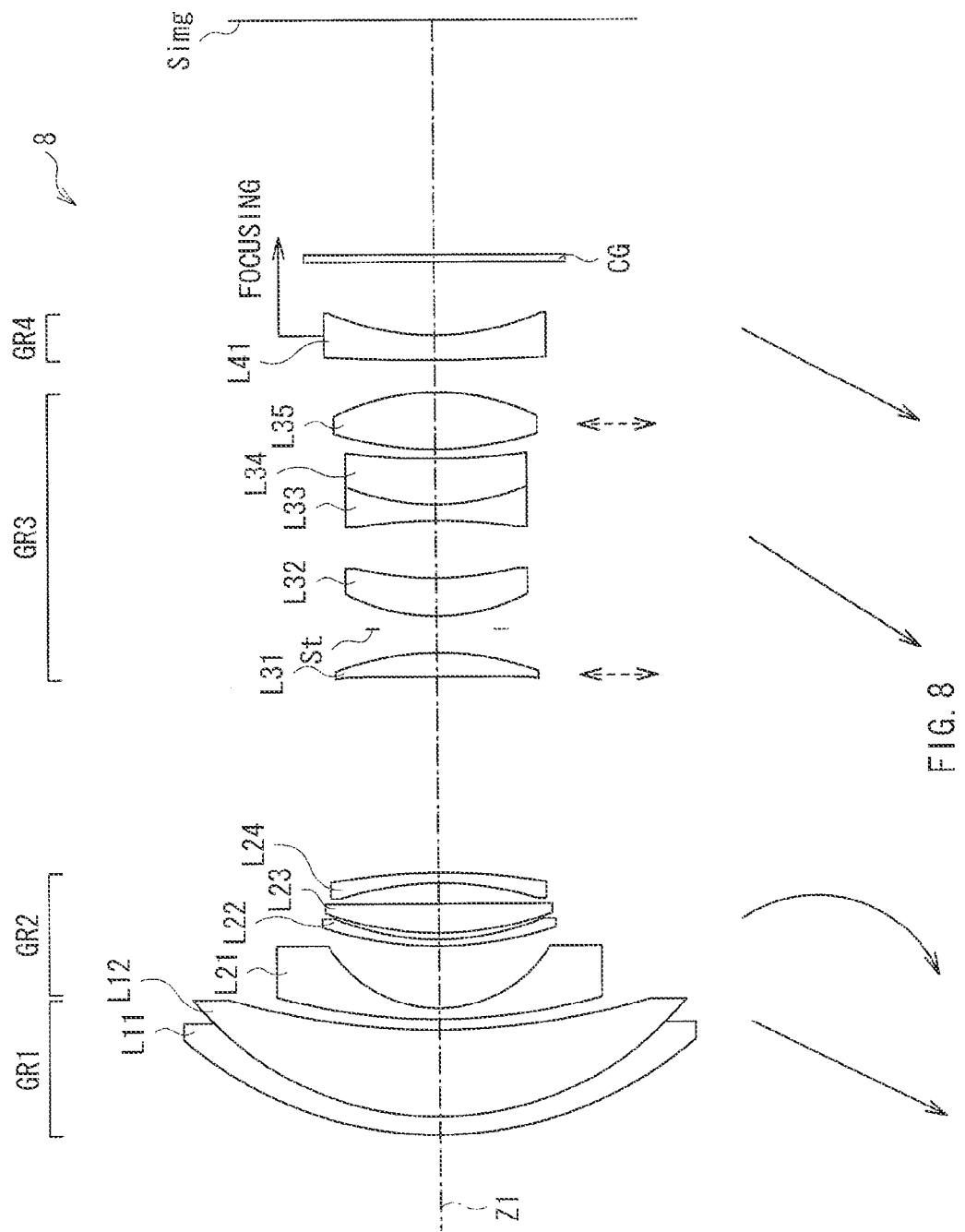

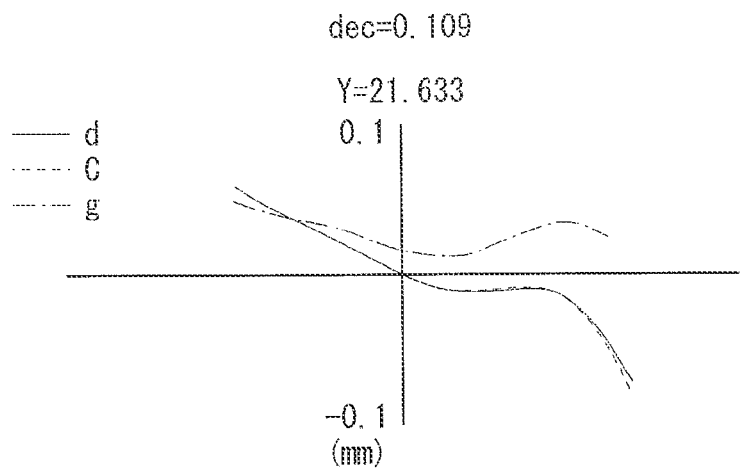
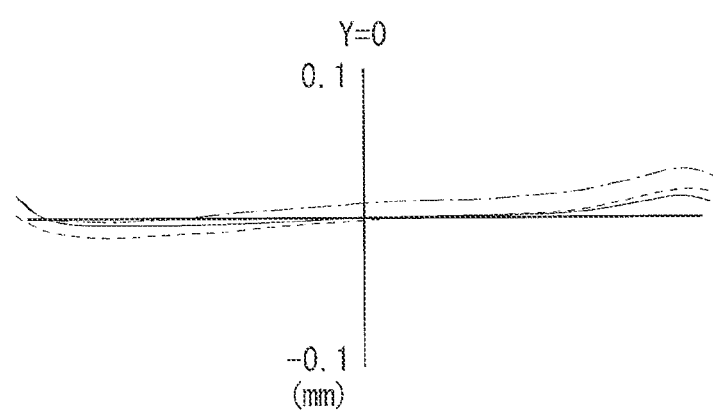
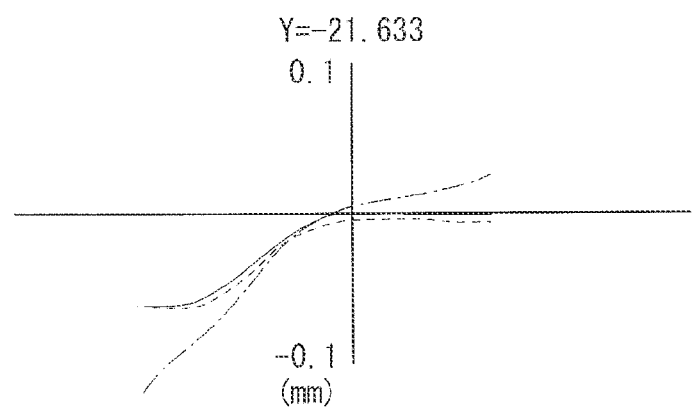
FIG. 20

ZOOM LENS AND IMAGE PICKUP UNIT

BACKGROUND

The present disclosure relates to a zoom lens that includes a wide-angle range as a variable magnification range, and to an image pickup unit that uses such a zoom lens. In particular, the present disclosure relates to a zoom lens suitable as an image pickup lens system of a digital camera system with interchangeable lenses, and to an image pickup unit that uses such a zoom lens.

Recently, a digital camera system with interchangeable lenses has been in wide spread use. In particular, a camera system is changing to a digital camera system with interchangeable lenses that does not include any quick-return mirror in a main body of the camera, which is called a mirrorless digital camera.

SUMMARY

Digital camera systems with interchangeable lenses in recent years are capable of shooting video. Therefore, a zoom lens favorable not only for shooting still images but also for shooting video is desired. It is necessary to move a focusing lens group at high speed in shooting video so as to follow quick movement of a subject. To achieve this, it is necessary to reduce weight of the focusing lens groups while maintaining favorable optical performance. Japanese Unexamined Patent Application Publications Nos. 2002-365549 (JP2002-365549A) and H04-296809 disclose a zoom lens of a four-zoom type, which, however, does not have lens performance favorable as an image pickup lens system of the digital camera system with interchangeable lenses. The zoom lens disclosed in JP2002-365549A is a lens mainly used for a film camera and is not suitable for digital camera application since light rays enter an image plane at an acute angle. In a digital camera that uses an image pickup device such as CCD (charge coupled device) and CMOS (complementary metal oxide semiconductor), it is preferable that an angle at which light rays enter an image plane be close to vertical since sensitivity of the image pickup device with respect to incident light rays is angle-dependent.

It is desirable to provide a zoom lens that is compact yet capable of high-speed focusing applicable to video shooting and has high imaging performance, and an image pickup unit.

According to an embodiment of the present disclosure, there is provided a zoom lens including: a first lens group having positive refractive power; a second lens group having negative refractive power; a third lens group having positive refractive power; and a fourth lens group having negative refractive power, and configured of a single negative lens or of a cemented lens configured of a positive lens and a negative lens that are arranged in recited order from object plane toward image plane and are attached to each other, the first to fourth lens groups being arranged in recited order from the object plane toward the image plane. A magnification-varying operation from wide end to telephoto end causes both the first lens group and the third lens group to travel toward the object plane and causes both the second lens group and the fourth lens group to travel along an optical axis. A focusing operation causes the fourth lens group to travel along the optical axis. The following conditional expression is satisfied, $$0.7 < (R4f + R4r)/(R4f - R4r) < 5 \qquad (1)$$

where R4f is a radius of curvature of a most-object-sided optical surface in the fourth lens group, and R4r is a radius of curvature of a most-image-sided optical surface in the fourth lens group.

According to an embodiment of the present disclosure, there is provided an image pickup unit with a zoom lens and an image pickup device outputting an image pickup signal based on an optical image formed by the zoom lens, the zoom lens including: a first lens group having positive refractive power; a second lens group having negative refractive power; a third lens group having positive refractive power; and a fourth lens group having negative refractive power, and configured of a single negative lens or of a cemented lens configured of a positive lens and a negative lens that are arranged in recited order from object plane toward image plane and are attached to each other, the first to fourth lens groups being arranged in recited order from the object plane toward the image plane. A magnification-varying operation from wide end to telephoto end causes both the first lens group and the third lens group to travel toward the object plane and causes both the second lens group and the fourth lens group to travel along an optical axis. A focusing operation causes the fourth lens group to travel along the optical axis. The following conditional expression is satisfied, $$0.7 < (R4f + R4r)/(R4f - R4r) < 5 \qquad (1)$$

where R4f is a radius of curvature of a most-object-sided optical surface in the fourth lens group, and R4r is a radius of curvature of a most-image-sided optical surface in the fourth lens group.

In the zoom lens and the image pickup unit according to the embodiments of the present disclosure, a configuration of each group is optimized in a positive-negative-positive-negative four-group zoom configuration. Therefore, for example, performance suitable for a digital camera system with interchangeable lenses is obtained.

According to the zoom lens and the image pickup unit according to the embodiments of the present disclosure, the positive-negative-positive-negative four-group zoom configuration is adopted and the configuration of each lens group is optimized. Therefore, compact size is achieved while achieving high-speed focusing applicable to video shooting and high imaging performance.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

FIG. 8 is a lens cross-sectional view illustrating a eighth configuration example of the zoom lens and corresponding to Numerical Example 8.

FIG. 20 is a lateral aberration diagram of the zoom lens corresponding to Numerical Example 1 at the long focal length end in the case where image blur is compensated with the positive lens located closest to the image plane in the third lens group.

DETAILED DESCRIPTION

Preferred embodiments of the present disclosure will be hereinafter described in detail with reference to the drawings. Description will be given in the following order.
1. Basic Configuration of Lenses
2. Functions and Effects
3. Example of Application to Image Pickup Unit
4. Numerical Examples of Lenses
5. Other Embodiments

1. Basic Configuration of Lenses

Figure 1:
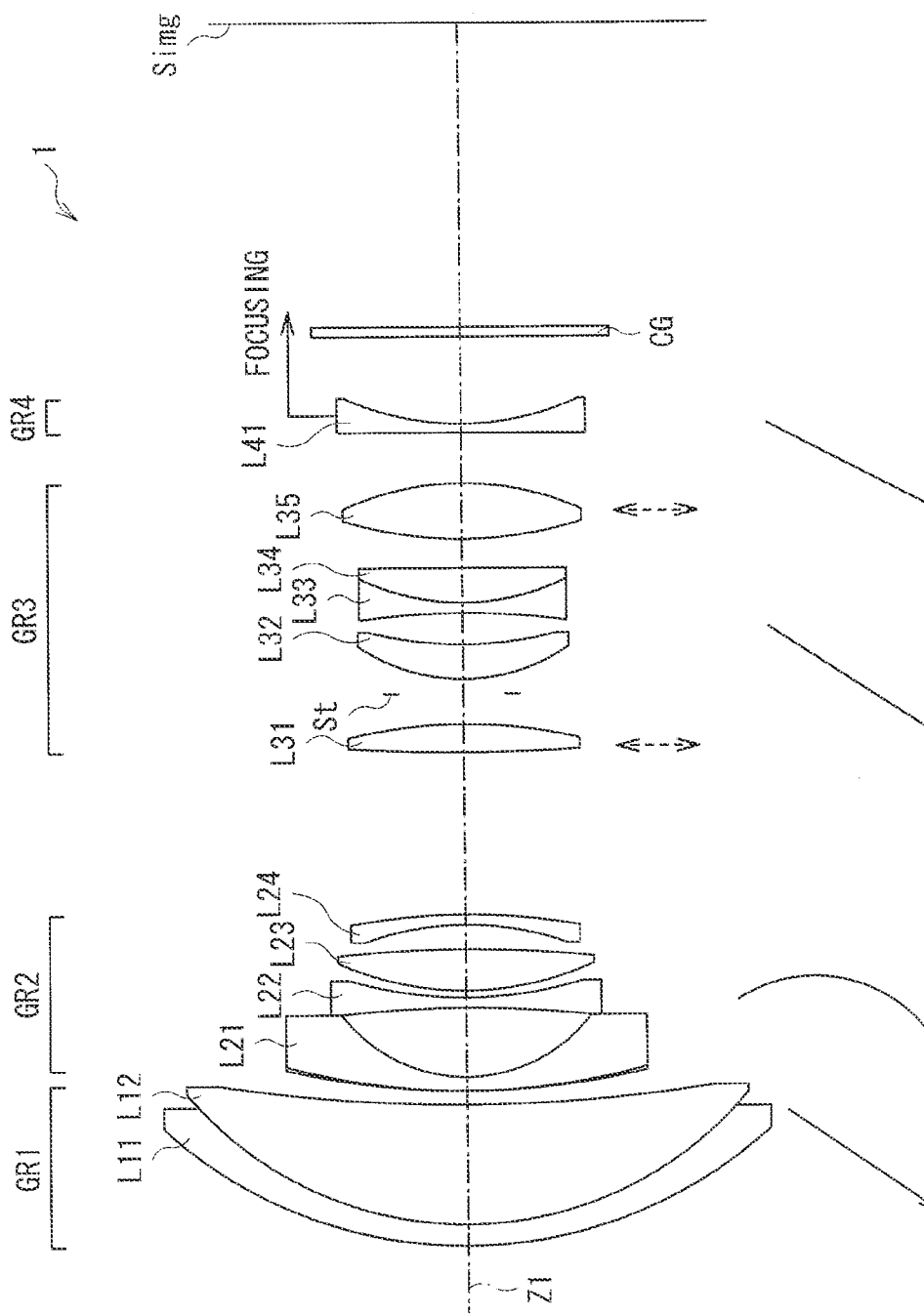
FIG. 1 is a lens cross-sectional view illustrating a first configuration example of a zoom lens according to an embodiment of the present disclosure and corresponding to Numerical Example 1.

FIG. 1 illustrates a first configuration example of an image pickup lens according to an embodiment of the present disclosure. The present configuration example corresponds to a lens configuration of Numerical Example 1 which will be described later. FIG. 1 corresponds to a lens arrangement in a condition that infinite is in focus at wide end (at short focal length end). Similarly, FIGS. 2 to 8 illustrate cross-sectional configurations of second to eighth configuration examples corresponding to lens configurations of later-described Numerical Examples 2 to 8. A symbol Simg denotes an image plane and Z1 denotes an optical axis in FIGS. 1 to 8.

A zoom lens according to the present embodiment is substantially configured of four lens groups. The zoom lens includes a first lens group GR1 having positive refractive power, a second lens group GR2 having negative refractive power, a third lens group GR3 having positive refractive power, and a fourth lens group GR4 having negative refractive power that are arranged along the optical axis Z1 in order from object plane toward the image plane. An optical member CG such as a cover glass or an optical filter may be arranged between the fourth lens group GR4 and the image plane Simg.

An aperture stop St is provided in the third lens group GR3 and travels together with the third lens group GR3 upon varying magnification.

Upon varying magnification from wide end to telephoto end, the first lens group GR1 and the third lens group GR3 travel toward the object plane, and the second lens group GR2 and the fourth lens group GR4 travel along an optical axis Z1. FIGS. 1 to 8 illustrate a locus of movement of each lens group upon varying magnification from the wide end to the telephoto end. Upon focusing, the fourth lens group GR4 travels along the optical axis Z1. Specifically, the fourth lens group GR4 travels toward the image plane upon focusing on an object at a short distance.

Figure 4:
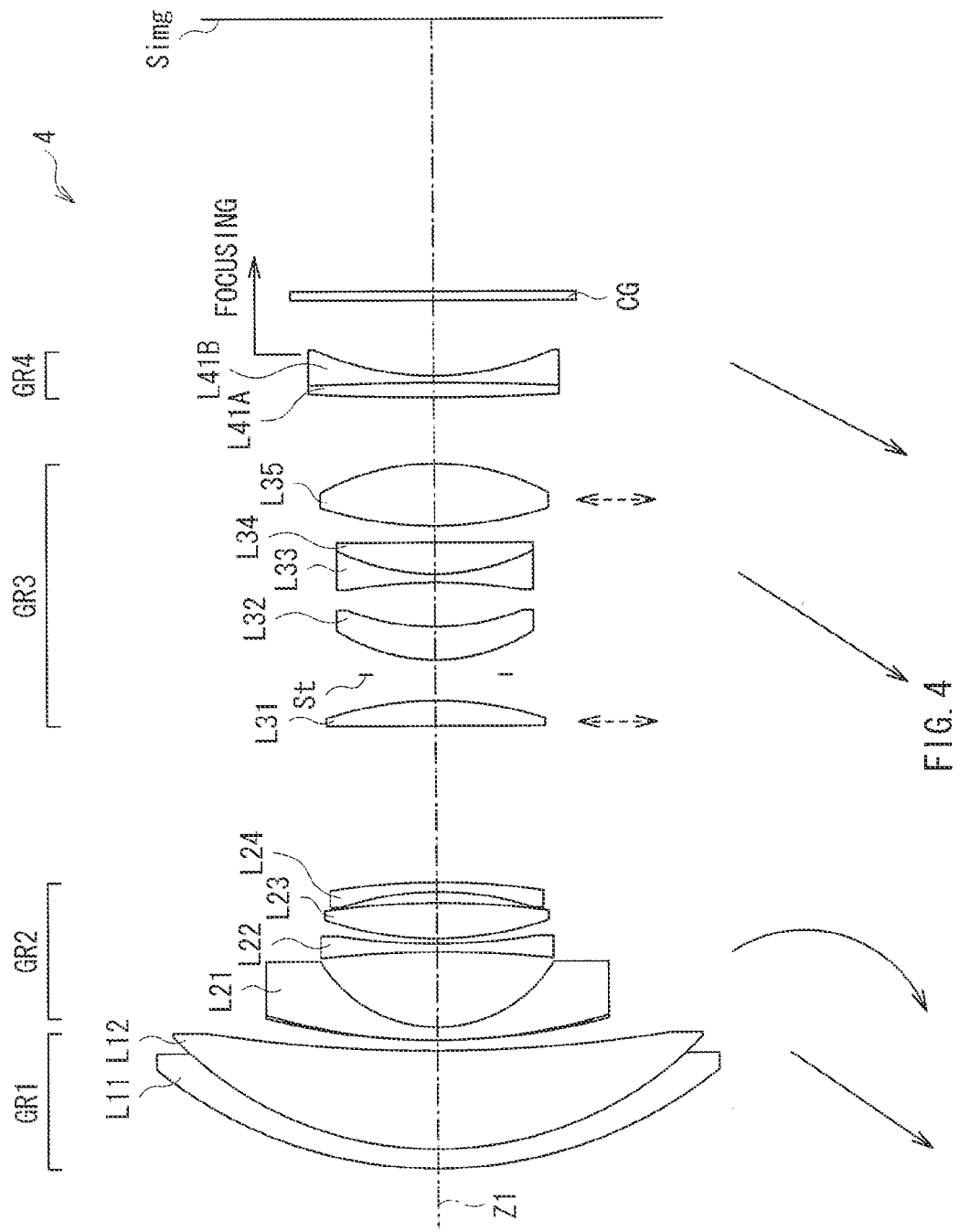
FIG. 4 is a lens cross-sectional view illustrating a fourth configuration example of the zoom lens and corresponding to Numerical Example 4.
Figure 5:
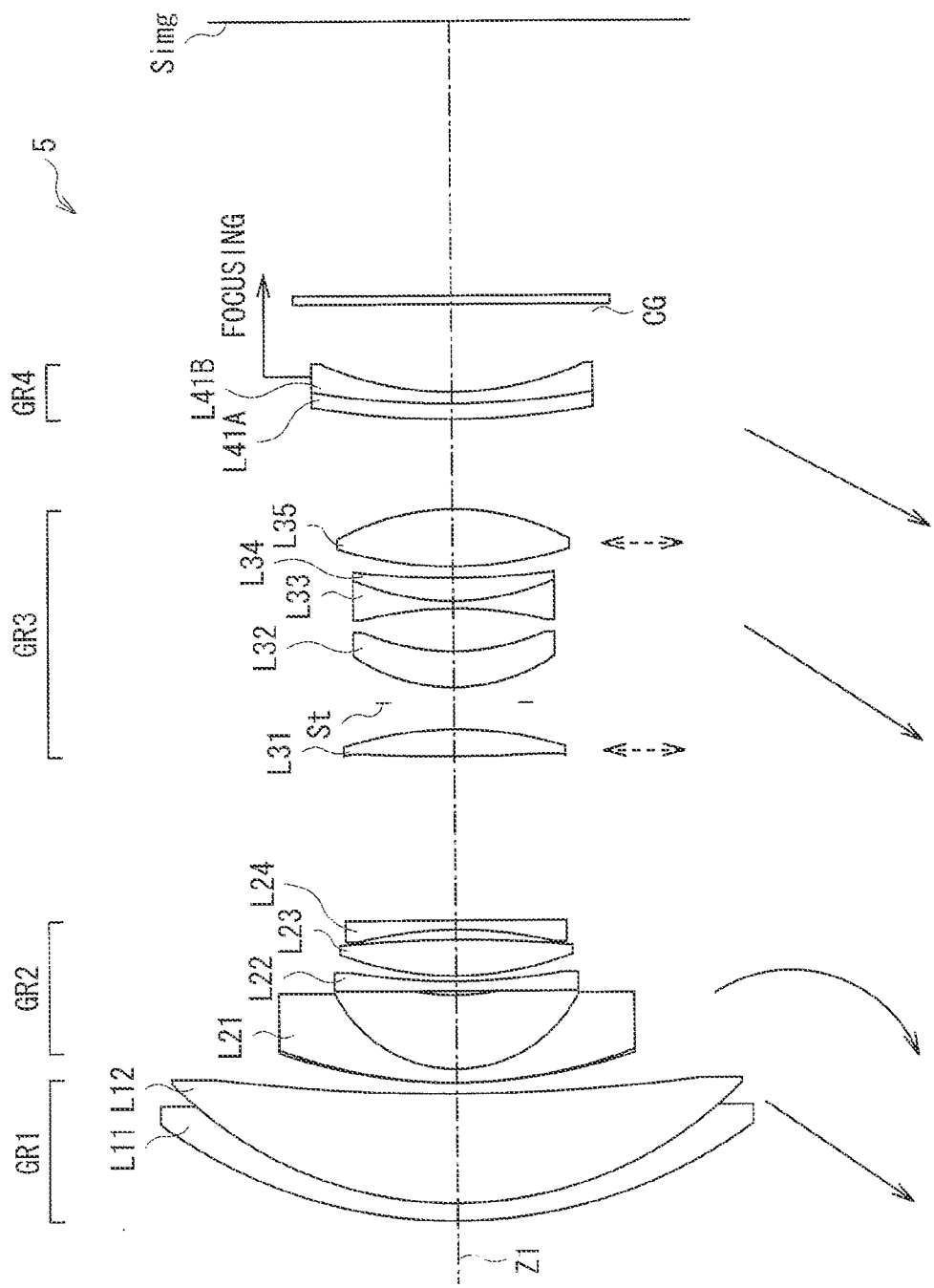
FIG. 5 is a lens cross-sectional view illustrating a fifth configuration example of the zoom lens and corresponding to Numerical Example 5.

The fourth lens group GR4 is configured of a single negative lens or is configured of a cemented lens in which a positive lens and a negative lens are arranged in order from the object plane and are attached to each other. To give a specific configuration example, the fourth lens group GR4 is configured only of one negative lens L41 in each of zoom lenses 1 to 3 and 6 to 8 according to first to third and sixth to eighth configuration examples (FIGS. 1 to 3 and 6 to 8). The fourth lens group GR4 is configured of a cemented lens in which a positive lens L41A and a negative lens L41B are attached to each other in each of zoom lenses 4 and 5 according to fourth and fifth configuration examples (FIGS. 4 and 5).

The first lens group GR1 is preferably configured of a cemented lens in which a negative lens L11 and a positive lens L12 are arranged in order from the object plane and are attached to each other.

The third lens group GR3 includes a plurality of lenses that include one or more positive lenses. It is preferable to move a positive Tense in the third lens group GR3, as an image blur compensation lens, in a direction perpendicular to the optical axis Z1 so as to compensate image blur. For example, it is preferable to use, as the image blur compensation lens, a positive lens L31 that is arranged closest to the object plane in the third lens group GR3. Alternatively, a positive lens L35 that is arranged closest to the image plane in the third lens group GR3 may be used as the image blur compensation lens.

In addition thereto, the zoom lens according to the present embodiment preferably satisfies predetermined conditional expressions which will be described later.

2. Functions and Effects

Functions and effects of the zoom lens according to the present embodiment will be described below.

In the zoom lens according to the present embodiment, the fourth lens group GR4 which is a focus lens group is configured of a single negative lens or is configured of a cemented lens in which a positive lens and a negative lens are arranged in order from the object plane and are attached to each other. The fourth lens group GR4 is thus light weighted. Therefore, it is possible to move the focus lens group at high speed with use of a compact actuator. The use of the compact actuator prevents increase in lens barrel size.

In the zoom lens according to the present embodiment, the first lens group GR1 is configured only of the cemented lens that includes the negative lens L11 and the positive lens L12. Therefore, the first lens group GR1 is allowed to be thinner while chromatic aberration is favorably corrected.

In the zoom lens according to the present embodiment, off-axial optical flux and on-axial optical flux that pass through the third lens group GR3 have narrow widths. Therefore, lenses included in the third lens group GR3 each have a smaller lens diameter compared to lenses in other lens groups. Therefore, the lenses in the third lens group GR3 are light-weighted and are movable with use of a compact actuator, which are therefore suitable to be used as the image blur compensation lens. In particular, when the positive lens L31 arranged closest to the object plane in the third lens group GR3 is used as the image blur compensation lens, the actuator is easily arranged in terms of mechanical configuration and it is possible to provide an image blur compensation function while maintaining the compact lens size. Further, it is possible to provide the image blur compensation function while maintaining the compact lens size also when the positive lens L35 arranged closest to the image plane in the third lens group GR3 is used as the image blur compensation lens.

[Description of Conditional Expressions]

The zoom lens according to the present embodiment achieves more preferable performance by so optimizing the configuration of each lens group as to satisfy at least one, preferably, two or more in combination, of the following conditional expressions.

The zoom lens according to the present embodiment desirably satisfies the following conditional expression (1):

$$0.7 < (R4f + R4r)/(R4f - R4r) < 5 \qquad (1)$$

where R4f is a radius of curvature of a most-object-sided optical surface in the fourth lens group, i.e., a radius of curvature of a surface located closest to the object plane of the fourth lens group GR4, and R4r is a radius of curvature of a most-image-sided optical surface in the fourth lens group, i.e., a radius of curvature of a surface located closest to the image plane of the fourth lens group GR4.

The conditional expression (1) defines a shape factor of the fourth lens group GR4. When a value of (R4f+R4r)/(R4f−R4r) is smaller than the lower limit of the conditional expression (1), the most-object-sided optical surface in the fourth lens group GR4 becomes a concave surface with high curvature. This results in that marginal light rays in the on-axial light flux enter the fourth lens group GR4 at a large angle. Consequently, spherical aberration occurs more easily. When the value of (R4f+R4r)/(R4f−R4r) is larger than the upper limit of the conditional expression (1), the most-image-sided optical surface in the fourth lens group GR4 becomes a concave surface with high curvature. In addition thereto, the off-axial light flux enters the most-image-sided optical surface in the fourth lens group GR4 at a large angle. Consequently, comatic aberration occurs more easily.

It is to be noted that a numerical range of the above-described conditional expression (1) is preferably set as the following conditional expression (1)'.

$$1.0<(R4f+R4r)/(R4f-R4r)<3.5 \tag{1}'$$

The zoom lens according to the present embodiment preferably satisfies the following conditional expression (2):

$$-4.5<f4/fw<-0.5 \tag{2}$$

where fw is a focal length of whole of the zoom lens in a condition that infinite is in focus at the wide end, and f4 is a focal length of the fourth lens group GR4.

The conditional expression (2) defines a ratio of the focal length f4 of the fourth lens group GR4, which is the focus lens group, with respect to the focal length fw of the whole of the zoom lens in the condition that the infinite is in focus at the wide end. When a value of f4/fw is smaller than the lower limit of the conditional expression (2), a traveling distance of the fourth lens group GR4 from a focus position in focusing on an object at the infinite to a focus position in focusing on an object at short distance becomes long. In other words, a focus stroke becomes long. Therefore, length of the whole lens becomes long. When the value of f4/fw is larger than the upper limit of the conditional expression (2), a position of the image plane excessively varies due to the movement of the focus lens group. Therefore, excessively-strict stopping accuracy of the actuator becomes necessary. Also, eccentric sensitivity becomes large, and therefore, difficulty in manufacturing is increased.

It is to be noted that a numerical range of the above-described conditional expression (2) is preferably set as the following conditional expression (2)'.

$$-3.5<f4/fw<-1.3 \tag{2}'$$

The zoom lens according to the present embodiment preferably satisfies the following conditional expression (3):

$$1.5<f1/fw<6.0 \tag{3}$$

where f1 is a focal length of the first lens group GR1.

The conditional expression (3) defines a ratio of the focal length f1 of the first lens group GR1 with respect to the focal length fw of the whole of the zoom lens in the condition that the infinite is in focus at the wide end. When a value of f1/fw is smaller than the lower limit of the conditional expression (3), power of the first lens group GR1 is enhanced and the eccentric sensitivity is increased. When the value of f1/fw is larger than the upper limit of the conditional expression (3), the power of the first lens group GR1 is weakened and the traveling distance of the first lens group GR1 becomes long in varying magnification from the wide end to the telephoto end, which results in larger mirror-barrel size.

It is to be noted that a numerical range of the above-described conditional expression (3) is preferably set as the following conditional expression (3)':

$$2.0<f1/fw<5.5 \tag{3}'$$

Further, the numerical range of the above-described conditional expression (3) is more preferably set as the following conditional expression (3)".

$$2.0<f1/fw<4.3 \tag{3}''$$

The zoom lens according to the present embodiment preferably satisfies the following conditional expression (4):

$$v4n>45 \tag{4}$$

where v4n is an Abbe number of the negative lens included in the fourth lens group GR4.

The conditional expression (4) defines the Abbe number of the negative lens included in the fourth lens group GR4. When a value of v4n is smaller than the lower limit of the conditional expression (4), an amount of variation in on-axial chromatic aberration and an amount of variation in magnification chromatic aberration increase excessively at the time of focusing.

It is to be noted that a numerical range of the above-described conditional expression (4) is preferably set as the following conditional expression (4)'.

$$v4n>55 \tag{4}'$$

As described above, according to the present embodiment, the positive-negative-positive-negative four-group zoom configuration is adopted, and the configuration of each lens group is optimized. Therefore, compact size and high-speed focusing applicable to video shooting are achieved. In addition thereto, high imaging performance is also achieved.

3. Example of Application to Image Pickup Unit

Figure 42:
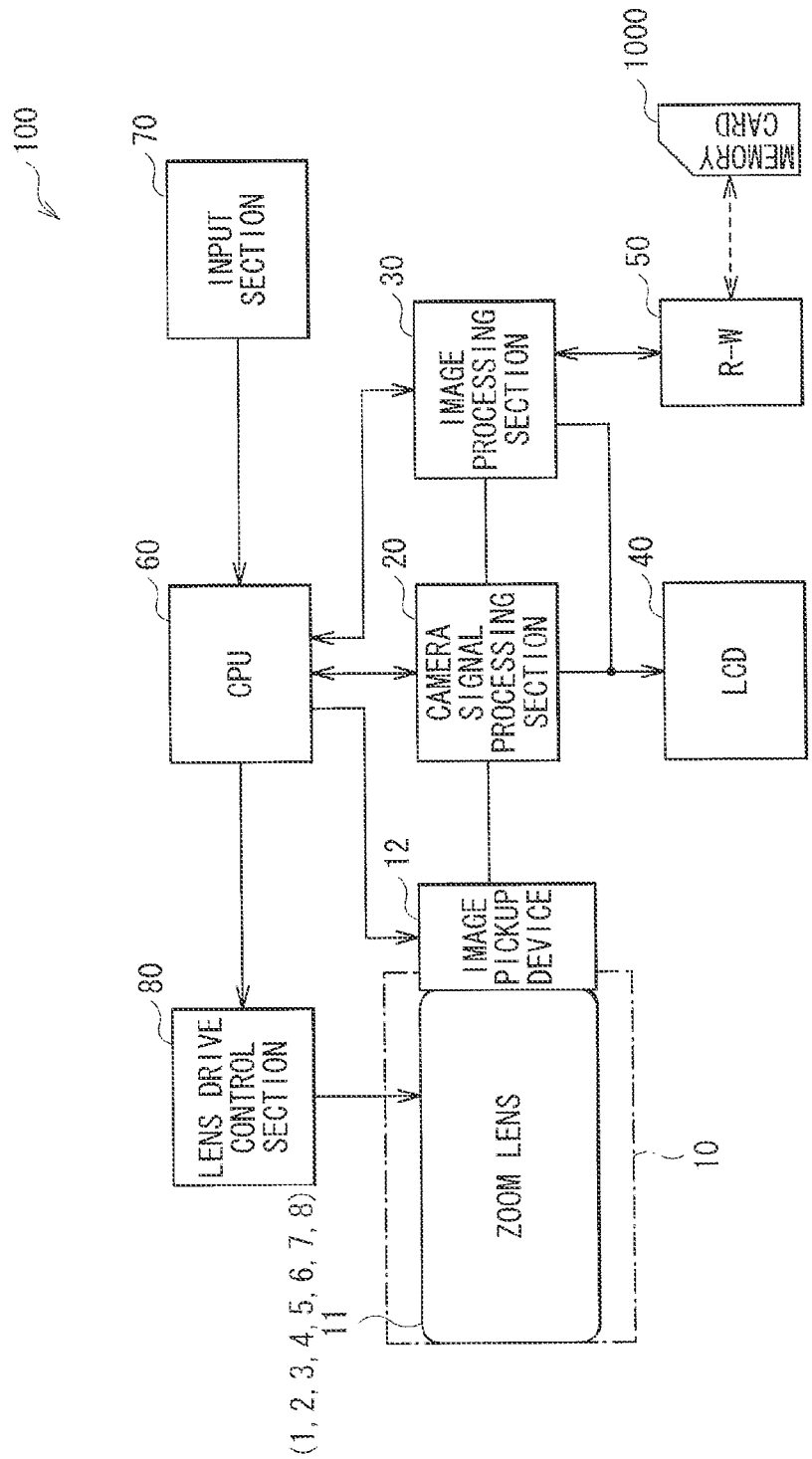
FIG. 42 is a block diagram illustrating a configuration example of an image pickup unit.

FIG. 42 illustrates a configuration example of an image pickup unit 100 to which the zoom lens according to the present embodiment is applied. The image pickup unit 100 may be, for example, a digital still camera. The image pickup unit 100 may include, for example, a camera block 10, a camera signal processing section 20, an image processing section 30, an LCD (liquid crystal display) 40, an R-W (reader-writer) 50, a CPU (central processing unit) 60, an input section 70, and a lens drive control section 80.

The camera block 10 serves to perform an image pickup function. The camera block 10 includes an optical system including a zoom lens 11 (any of the zoom lenses 1 to 8 shown in FIGS. 1 to 8) as an image pickup lens, and includes an image pickup device 12 such as CCD (charge coupled device) and CMOS (complementary metal oxide semiconductor). The image pickup device 12 converts an optical image formed by the zoom lens 11 into an electric signal to output an image pickup signal (image signal) based on the optical image.

The camera signal processing section 20 performs, on the image signal outputted from the image pickup device 12, various signal processes such as analog-to-digital conversion, denoising, image quality correction, and conversion into luminance and color-difference signals.

The image processing section 30 performs recording and reproducing processes on the image signal. The image processing section 30 may perform, for example, compression encoding and expansion decoding of the image signal based on a predetermined image data format, conversion of data specifications such as resolution, etc.

The LCD 40 has a function of displaying various data including, for example, an operation state of a user with respect to the input section 70 and photographed images. The R-W 50 writes, on the memory card 1000, image data that has been encoded by the image processing section 30 and reads the image data stored in the memory card 1000. The memory card 1000 may be, for example, a semiconductor memory attachable to and detachable from a slot connected to the R-W 50.

The CPU 60 functions as a control processing section that controls each circuit block provided in the image pickup unit 100. The CPU 60 controls each circuit block based on, for example, an instruction input signal from the input section 70, etc. The input section 70 is configured of components such as various switches by which necessary operations are performed by a user. The input section 70 may be configured of, for example, a shutter release button for shutter operation, a selection switch for selecting operation modes, and/or the like. The input section 70 outputs, with respect to the CPU 60, an instruction input signal according to the operation by the user. The lens drive control section 80 controls driving of lenses arranged in the camera block 10. The lens drive control section 80 may control an unillustrated motor that drives each lens in the zoom lens 11 based on a control signal from the CPU 60, for example.

The image pickup unit 100 includes a shake detection section that detects shake of the unit resulting from shake of hands, which is not illustrated.

Hereinafter, description will be given of operations in the image pickup unit 100. In a standby state for shooting, under control by the CPU 60, an image signal of an image shot in the camera block 10 is output to the LCD 40 through the camera signal processing section 20 to be displayed as a camera-through image. Further, for example, when the input section 70 inputs an instruction input signal for zooming, focusing, etc., the CPU 60 outputs a control signal to the lens drive control section 80, and the lens drive control section 80 controls predetermined lenses in the zoom lens 11 to travel.

When an unillustrated shutter of the camera block 10 operates in response to the instruction input signal from the input section 70, the camera signal processing section 20 outputs the shot image signal to the image processing section 30. The image processing section 30 performs compression encoding on the image signal and converts the image signal into digital data of a predetermined data format. The image processing section 30 outputs the converted data to the R-W 50 and the R-W 50 writes the converted data on the memory card 1000.

It is to be noted that focusing may be performed, for example, through allowing the predetermined lenses in the zoom lens 11 to be moved by the lens drive control section 80 in response to the control signal from the CPU 60, for example, when the shutter release button of the input section 70 is pressed halfway or when the shutter release button is fully pressed for recording (shooting).

Upon reproducing the image data recorded in the memory card 1000, the R-W 50 reads out a predetermined image data from the memory card 1000 in response to the operation with respect to the input section 70. The image processing section 30 performs extension decoding on the image data and outputs a reproduction image signal to the LCD 40. Thus, the reproduction image is displayed.

Moreover, the CPU 60 allows the lens drive control section 80 to operate based on a signal outputted from the unillustrated shake detection section, and allows the image blur compensation lens to move in a direction substantially perpendicular to the optical axis Z1 according to the amount of shake.

It is to be noted that, although the example in which the image pickup unit is applied to a digital still camera has been described above in the present embodiment, applications of the image pickup unit is not limited to digital still cameras, and other various electronic apparatuses may be the possible applications of the image pickup unit 100. For example, possible applications of the image pickup unit 100 include a camera with interchangeable lenses, a digital video camera, a mobile phone provided with a digital video camera etc., and a PDA (personal digital assistant).

EXAMPLES

4. Numerical Examples of Lenses

Hereinafter, description will be given of specific numerical examples of the zoom lens according to the present embodiment. Symbols etc. in the tables and the description below represent the following. "Surface No." represents the number of an i-th surface where a surface of the component located closest to the object is counted as a 1st surface and numerals are sequentially attached to surfaces of the components so that the numeral becomes larger as the surface of the component become closer to the image plane. "Ri" represents a radius of curvature (mm) of the i-th surface. "Di" represents a distance (mm) on the optical axis between the i-th surface and the (i+1)th surface. "Ndi" represents a value of a refractive index of the d line (with wavelength of 587.6 nm) of a material (medium) of an optical component that has the i-th surface. "vdi" represents a value of an Abbe number of the d line of the material of the optical component that has the i-th surface. "Fno" represents an F-number, "f" represents a focal length of the whole of the zoom lens, and "ω" represents a half angle of view. A surface with a surface number accompanied by "ASP" indicates that the surface is aspheric. A surface with a radius of curvature of "Infinity" is a planar surface or an aperture stop surface.

In each Example, a shape of an aspheric surface is expressed by the following expression. In data of an aspherical coefficient, a symbol "E" indicates that a numerical value following the symbol "E" is an "exponent of a power" having 10 as a base, and that a numerical value represented by an exponential function of 10 as a base is multiplied by a numerical value before "E". For example, "1.0E-05" represents "$1.0 \times 10^{-5}$".

(Expression of Aspheric Surface)

$$x=(y^2 \cdot c^2)/(1+(1-(1+k)y^2 \cdot c^2)^{1/2})+\Sigma Ai \cdot Yi$$

where x is a distance along the optical axis from a vertex of the lens surface, y is a height in the direction perpendicular to the optical axis, c is a paraxial curvature at the vertex of the lens, k is a conic constant, and Ai is the i-th aspherical coefficient.

Each of the zoom lenses 1 to 8 according to the numerical examples below is substantially configured of four lens groups. Each zoom lens includes the first lens group GR1 having positive refractive power, the second lens group GR2 having negative refractive power, the third lens group GR3 having positive refractive power, and the fourth lens group GR4 having negative refractive power that are arranged in order from the object plane. Upon varying magnification from the wide end to the telephoto end, the first lens group GR1 and the third lens group GR3 move toward the object plane and the second lens group GR2 and the fourth lens group GR4 move along the optical axis Z1. The aperture stop St is provided in the third lens group GR3 and moves together with the third lens group GR3 upon varying magnification. In focusing on an object at a short distance, the fourth lens group GR4 moves toward the image plane.

Numerical Example 1

[Table 1] to [Table 3] show specific lens data corresponding to the zoom lens 1 according to the first configuration example shown in FIG. 1. In particular, [Table 1] shows basic lens data thereof, and [Table 2] shows data on aspheric surfaces. [Table 3] shows other data. In the zoom lens 1, each lens group traveled as magnification varied. Therefore, a value of a surface distance between adjacent lens groups was variable. Data of the variable surface distance is shown in [Table 3]. [Table 3] also shows values of Fno, f, and ω.

The first lens group GR1 was configured of the cemented lens that included the negative lens L11 and the positive lens L12 that were arranged in order of from the object plane and were attached to each other. The negative lens L11 was a negative meniscus lens with a convex surface facing toward the object plane. The positive lens L12 was a positive meniscus lens with a convex surface facing toward the object. The second lens group GR2 included, in order from the object plane, a negative lens L21 that was configured of a negative meniscus lens with a convex surface facing toward the object plane and with a composite aspheric surface on the object plane side thereof, a negative lens L22 configured of a biconcave lens, a biconvex lens L23, and a negative lens L24 configured of a negative meniscus lens with a concave surface facing toward the object plane.

The third lens group GR3 included, in order from the object plane, the positive lens L31, the aperture stop St, a positive meniscus lens L32 with a convex surface facing toward the object plane, a cemented lens in which a biconcave lens L33 and a positive lens L34 configured of a positive meniscus lens with a convex surface facing toward the object plane were attached to each other, and a positive lens L35. In the third lens group GR3, the positive lens L31 located closest to the object plane and the positive lens L35 located closest to the image plane were each a biconvex lens with aspheric surfaces formed on the both sides thereof. Image blur is compensated through moving the positive lens L31 or the positive lens L35 in the direction perpendicular to the optical axis Z1. The fourth lens group GR4 was configured of a single negative lens L41. The negative lens L41 was a negative meniscus lens with a convex surface facing toward the object plane and with an aspheric surface formed on an image plane side thereof.

TABLE 1

Example 1

| Lens group | Surface No. | Ri | Di | Ndi | vdi |
|---|---|---|---|---|---|
| GR1 | 1 | 39.713 | 1.800 | 1.85505 | 23.78 |
| | 2 | 31.963 | 10.992 | 1.59489 | 68.62 |
| | 3 | 169.433 | (D3) | | |
| GR2 | 4(ASP) | 82.966 | 0.100 | 1.54285 | 45.00 |
| | 5 | 62.311 | 1.200 | 1.74690 | 49.22 |
| | 6 | 13.479 | 6.286 | | |
| | 7 | −101.607 | 0.900 | 1.80932 | 39.64 |
| | 8 | 38.370 | 0.577 | | |
| | 9 | 26.334 | 3.796 | 1.85505 | 23.78 |
| | 10 | −121.299 | 2.258 | | |

TABLE 1-continued

Example 1

| Lens group | Surface No. | Ri | Di | Ndi | vdi |
|---|---|---|---|---|---|
| | 11(ASP) | −26.549 | 0.900 | 1.81081 | 40.73 |
| | 12 | −47.780 | (D12) | | |
| GR3 | 13(ASP) | 173.731 | 2.414 | 1.59412 | 67.02 |
| | 14(ASP) | −38.540 | 2.500 | | |
| | 15 (aperture stop) | Infinity | 1.500 | | |
| | 16 | 17.775 | 2.901 | 1.59489 | 68.62 |
| | 17 | 32.958 | 2.898 | | |
| | 18 | −72.257 | 0.800 | 1.91048 | 31.31 |
| | 19 | 20.272 | 3.000 | 1.56605 | 60.83 |
| | 20 | 188.332 | 2.812 | | |
| | 21(ASP) | 30.819 | 5.000 | 1.69980 | 55.46 |
| | 22(ASP) | −22.823 | (D22) | | |
| GR4 | 23 | 4675.723 | 0.800 | 1.59412 | 67.02 |
| | 24(ASP) | 25.458 | (D24) | | |
| | 25 | Infinity | 0.800 | 1.51872 | 64.20 |
| | 26 | Infinity | (D26) | | |

TABLE 2

Example 1

| Surface No. | k | A4 | A6 | A8 | A10 |
|---|---|---|---|---|---|
| 4 | 0 | 6.8837E−06 | −1.2798E−08 | 3.5641E−11 | −3.8705E−14 |
| 11 | 0 | 1.0076E−06 | 2.4870E−09 | −1.2103E−11 | −1.9130E−13 |
| 13 | 0 | −1.0731E−05 | −1.8028E−07 | 1.7480E−09 | −3.9299E−12 |
| 14 | 0 | −7.9789E−06 | −1.5240E−07 | 1.4243E−09 | −2.8780E−12 |
| 21 | 0 | −2.2020E−05 | −3.5095E−08 | 6.3239E−10 | −3.9460E−12 |
| 22 | 0 | 2.5336E−05 | −1.0943E−07 | 9.7663E−10 | −4.5113E−12 |
| 24 | 0 | −8.3678E−06 | 6.5596E−08 | −1.6761E−10 | −5.3066E−13 |

TABLE 3

Example 1

| | Wide end | Intermediate | Telephoto end |
|---|---|---|---|
| Fno | 4.12 | 4.12 | 4.12 |
| f | 28.84 | 45.50 | 72.78 |
| ω | 37.64 | 24.68 | 15.88 |
| D3 | 1.000 | 13.119 | 22.424 |
| D12 | 14.778 | 6.570 | 1.500 |
| D22 | 4.500 | 4.457 | 2.000 |
| D24 | 7.798 | 7.840 | 10.298 |
| D26 | 27.189 | 34.139 | 48.504 |

Numerical Example 2

Figure 2:
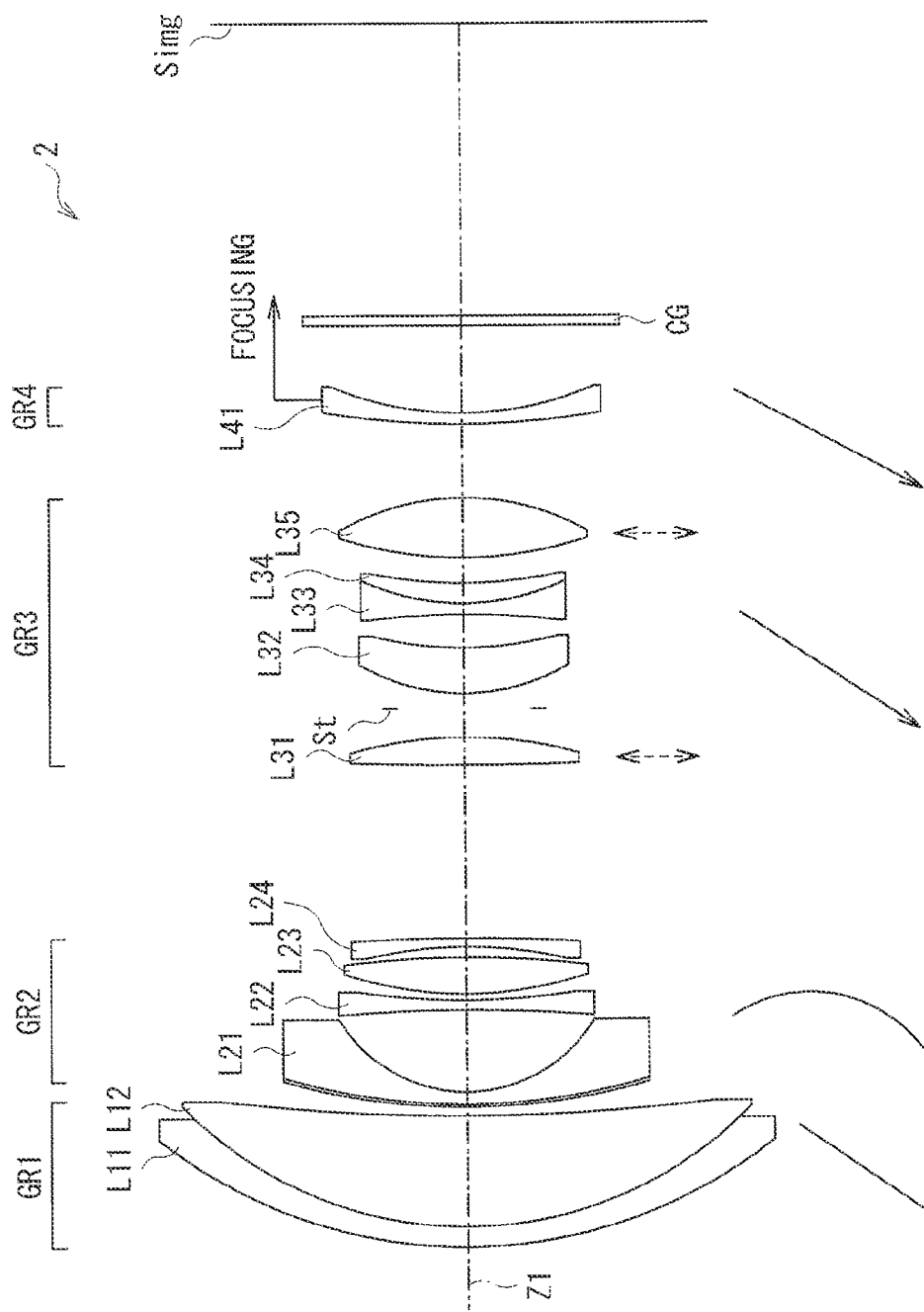
FIG. 2 is a lens cross-sectional view illustrating a second configuration example of the zoom lens and corresponding to Numerical Example 2.

[Table 4] to [Table 6] show specific lens data corresponding to the zoom lens 2 according to the second configuration example shown in FIG. 2. In particular, [Table 4] shows basic lens data thereof, and [Table 5] shows data on aspheric surfaces. [Table 6] shows other data. In the zoom lens 2, each lens group traveled as magnification varied. Therefore, a value of a surface distance between adjacent lens groups was variable. Data of the variable surface distance is shown in [Table 6]. [Table 6] also shows values of Fno, f, and ω.

A basic shape of each lens group in the zoom lens 2 was similar to that in the zoom lens 1 according to the above-described first configuration example. Also in the zoom lens 2, image blur is compensated through moving the positive lens L31 located closest to the object plane or the positive lens L35 located closest to the image plane in the third lens group GR3 in a direction perpendicular to the optical axis Z1.

TABLE 4

Example 2

| Lens group | Surface No. | Ri | Di | Ndi | vdi |
|---|---|---|---|---|---|
| GR1 | 1 | 43.547 | 1.800 | 1.85505 | 23.78 |
| | 2 | 35.170 | 9.920 | 1.59489 | 68.62 |
| | 3 | 179.953 | (D3) | | |
| GR2 | 4(ASP) | 64.839 | 0.080 | 1.55290 | 45.00 |
| | 5 | 53.749 | 1.200 | 1.74690 | 49.22 |
| | 6 | 13.001 | 7.345 | | |
| | 7 | −108.030 | 0.900 | 1.80932 | 39.64 |
| | 8 | 77.336 | 0.500 | | |
| | 9 | 32.112 | 3.340 | 1.85505 | 23.78 |
| | 10 | −94.043 | 0.985 | | |
| | 11(ASP) | −34.369 | 0.900 | 1.81081 | 40.73 |
| | 12 | −151.071 | (D12) | | |
| GR3 | 13(ASP) | 158.641 | 2.409 | 1.59412 | 67.02 |
| | 14(ASP) | −38.959 | 2.500 | | |
| | 15 (aperture stop) | Infinity | 1.500 | | |
| | 16 | 18.534 | 4.000 | 1.59489 | 68.62 |
| | 17 | 35.447 | 3.042 | | |
| | 18 | −59.987 | 0.800 | 1.91048 | 31.31 |
| | 19 | 19.940 | 2.040 | 1.56605 | 60.83 |
| | 20 | 45.432 | 2.267 | | |
| | 21(ASP) | 31.711 | 5.269 | 1.69980 | 55.46 |
| | 22(ASP) | −21.394 | (D22) | | |
| GR4 | 23 | 88.321 | 0.800 | 1.59412 | 67.02 |
| | 24(ASP) | 29.440 | (D24) | | |
| | 25 | Infinity | 0.800 | 1.51872 | 64.20 |
| | 26 | Infinity | (D26) | | |

TABLE 5

Example 2

| Surface No. | k | A4 | A6 | A8 | A10 |
|---|---|---|---|---|---|
| 4 | 0 | 8.4058E−06 | −2.4288E−08 | 3.5721E−11 | −8.8178E−14 |
| 11 | 0 | 5.3765E−06 | 4.8312E−08 | −2.9351E−10 | 1.7906E−12 |
| 13 | 0 | −1.4169E−05 | −9.8410E−08 | 1.9167E−09 | −8.5597E−12 |
| 14 | 0 | −1.1007E−05 | −7.1114E−08 | 1.5522E−09 | −6.8620E−12 |
| 21 | 0 | −2.6511E−05 | 6.3490E−08 | −2.3568E−10 | −2.3127E−13 |
| 22 | 0 | 1.2217E−05 | −1.3993E−08 | 3.0883E−10 | −2.0209E−12 |
| 24 | 0 | −2.6181E−06 | 2.1408E−08 | 4.9487E−11 | −2.7610E−13 |

TABLE 6

Example 2

| | Wide end | Intermediate | Telephoto end |
|---|---|---|---|
| Fno | 4.12 | 4.12 | 4.12 |
| f | 28.83 | 45.51 | 72.81 |
| ω | 37.35 | 24.54 | 15.88 |
| D3 | 1.000 | 14.870 | 26.404 |
| D12 | 15.594 | 7.003 | 1.500 |
| D22 | 6.870 | 6.653 | 2.000 |
| D24 | 7.931 | 8.148 | 12.801 |
| D26 | 26.207 | 33.491 | 47.521 |

Numerical Example 3

Figure 3:
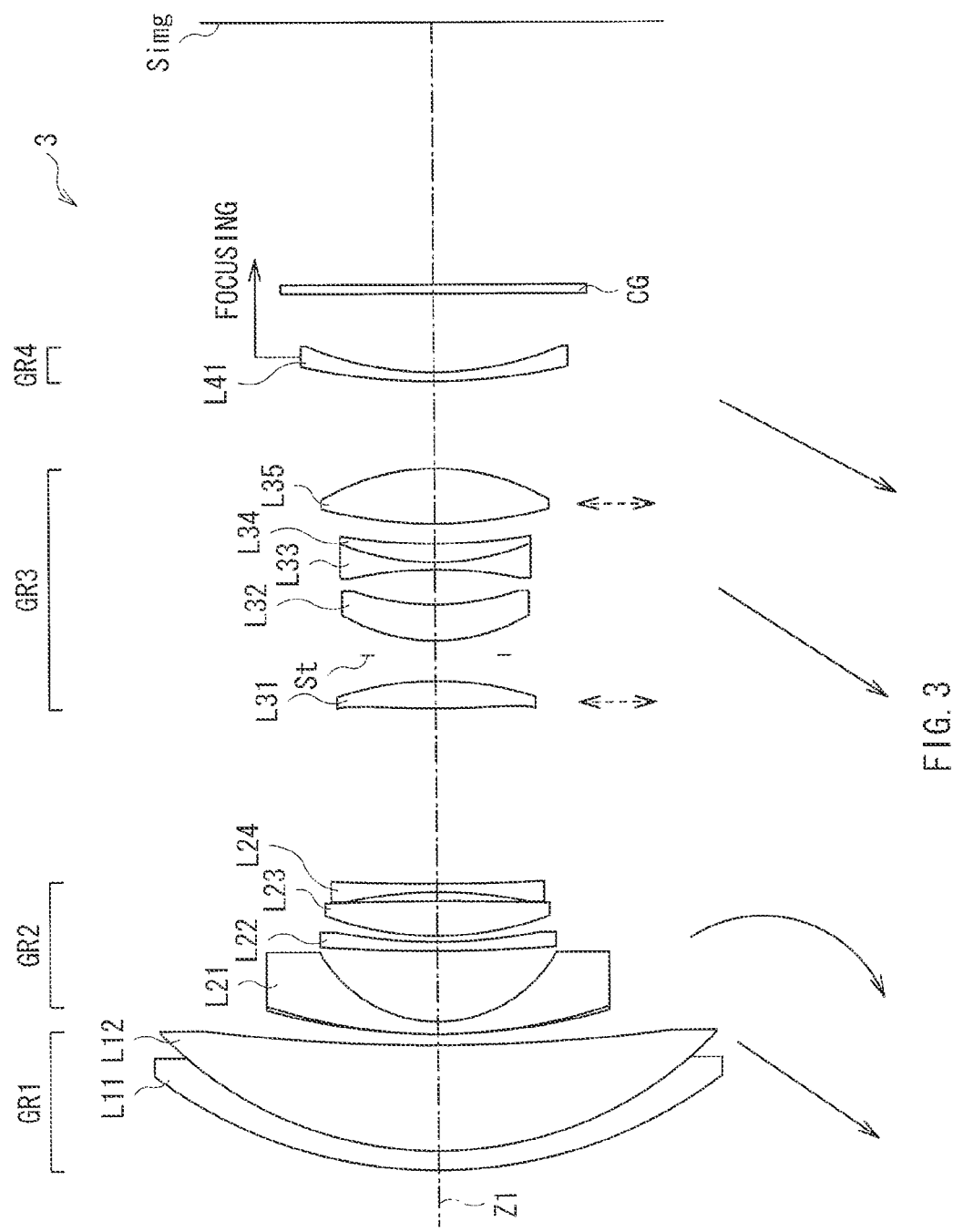
FIG. 3 is a lens cross-sectional view illustrating a third configuration example of the zoom lens and corresponding to Numerical Example 3.

[Table 7] to [Table 9] show specific lens data corresponding to the zoom lens 3 according to the third configuration example shown in FIG. 3. In particular, [Table 7] shows basic lens data thereof, and [Table 8] shows data on aspheric surfaces. [Table 9] shows other data. In the zoom lens 3, each lens group traveled as magnification varied. Therefore, a value of surface distance between adjacent lens groups was variable. Data of the variable surface distance is shown in [Table 9]. [Table 9] also shows values of Fno, f, and ω.

In the zoom lens 3, the second lens group GR2 included, in order from the object plane, the negative lens L21 configured of a negative meniscus lens with a convex surface facing toward the object plane and with a composite aspheric surface on the object plane side thereof, the negative lens L22 configured of a negative meniscus lens with a convex surface facing toward the object plane, the biconvex lens L23, and the negative lens L24 configured of a biconcave lens. Basic shapes of other lens groups were similar to those in the zoom lens 1 according to the above-described first configuration example. Also in the zoom lens 3, image blur is compensatable through moving the positive lens L31 located closest to the object plane or moving the positive lens L35 located closest to the image plane in the third lens group GR3 in a direction perpendicular to the optical axis Z1.

TABLE 7

Example 3

| Lens group | Surface No. | Ri | Di | Ndi | vdi |
|---|---|---|---|---|---|
| GR1 | 1 | 45.216 | 1.800 | 1.85505 | 23.78 |
| | 2 | 36.564 | 10.123 | 1.59489 | 68.62 |
| | 3 | 178.753 | (D3) | | |
| GR2 | 4(ASP) | 54.695 | 0.080 | 1.55290 | 45.00 |
| | 5 | 51.974 | 1.200 | 1.74690 | 49.22 |
| | 6 | 12.716 | 6.868 | | |
| | 7 | 178.488 | 0.900 | 1.80932 | 39.64 |
| | 8 | 59.518 | 0.500 | | |
| | 9 | 30.758 | 3.360 | 1.85505 | 23.78 |
| | 10 | −192.704 | 0.821 | | |
| | 11(ASP) | −42.293 | 0.900 | 1.81081 | 40.73 |
| | 12 | 326.416 | (D12) | | |
| GR3 | 13(ASP) | 154.680 | 2.500 | 1.59412 | 67.02 |
| | 14(ASP) | −34.245 | 2.500 | | |
| | 15 (aperture stop) | Infinity | 1.500 | | |
| | 16 | 17.749 | 3.380 | 1.59489 | 68.62 |
| | 17 | 26.537 | 3.314 | | |
| | 18 | −39.647 | 0.800 | 1.91048 | 31.31 |
| | 19 | 24.708 | 1.709 | 1.56605 | 60.83 |
| | 20 | 51.790 | 1.978 | | |
| | 21(ASP) | 33.692 | 5.300 | 1.69980 | 55.46 |
| | 22(ASP) | −19.843 | (D22) | | |

TABLE 7-continued

Example 3

| Lens group | Surface No. | Ri | Di | Ndi | vdi |
|---|---|---|---|---|---|
| GR4 | 23 | 60.088 | 0.800 | 1.62518 | 58.16 |
|  | 24(ASP) | 30.044 | (D24) |  |  |
|  | 25 | Infinity | 0.800 | 1.51872 | 64.20 |
|  | 26 | Infinity | (D26) |  |  |

TABLE 8

Example 3

| Surface No. | k | A4 | A6 | A8 | A10 |
|---|---|---|---|---|---|
| 4 | 0 | 5.0546E−06 | −1.7334E−08 | −1.8301E−11 | −1.8655E−14 |
| 11 | 0 | 1.4390E−05 | 5.5009E−08 | −3.2665E−10 | 3.6860E−12 |
| 13 | 0 | −1.9661E−05 | −1.4548E−07 | 2.5632E−09 | −2.9517E−11 |
| 14 | 0 | −1.4865E−05 | −1.1865E−07 | 2.1201E−09 | −2.5218E−11 |
| 21 | 0 | −2.9002E−05 | 7.7558E−08 | −3.1421E−10 | 3.8183E−13 |
| 22 | 0 | 1.1577E−05 | 4.4953E−09 | 1.5574E−10 | −8.4765E−13 |
| 24 | 0 | −1.9843E−06 | 1.7170E−08 | 2.9567E−11 | −1.2916E−13 |

TABLE 9

Example 3

|  | Wide end | Intermediate | Telephoto end |
|---|---|---|---|
| Fno | 4.12 | 4.12 | 4.12 |
| f | 28.84 | 45.50 | 72.77 |
| ω | 37.39 | 24.49 | 15.87 |
| D3 | 1.000 | 14.900 | 27.265 |
| D12 | 16.841 | 7.540 | 1.500 |
| D22 | 8.387 | 7.973 | 2.000 |
| D24 | 7.639 | 8.052 | 14.026 |
| D26 | 25.000 | 32.411 | 45.868 |

Numerical Example 4

[Table 10] to [Table 12] show specific lens data corresponding to the zoom lens 4 according to the fourth configuration example shown in FIG. 4. In particular, [Table 10] shows basic lens data thereof, and [Table 11] shows data on aspheric surfaces. [Table 12] shows other data. In the zoom lens 4, each lens group traveled as magnification varied. Therefore, a value of a surface distance between adjacent lens groups was variable. Data of the variable surface distance is shown in [Table 12]. [Table 12] also shows values of Fno, f, and ω.

In the zoom lens 4, the fourth lens group GR4 was configured of a cemented lens in which the positive lens L41A configured of a biconvex lens and the negative lens L41B configured of a biconcave lens with an aspheric surface formed on the image plane side thereof were attached to each other. Basic shapes of other lens groups were similar to those in the zoom lens 1 according to the above-described first configuration example. Also in the zoom lens 4, image blur is compensatable through moving the positive lens L31 located closest to the object plane or moving the positive lens L35 located closest to the image plane in the third lens group GR3 in a direction perpendicular to the optical axis Z1.

TABLE 10

Example 4

| Lens group | Surface No. | Ri | Di | Ndi | vdi |
|---|---|---|---|---|---|
| GR1 | 1 | 42.299 | 1.800 | 1.85505 | 23.78 |
|  | 2 | 34.360 | 9.499 | 1.59489 | 68.62 |
|  | 3 | 157.374 | (D3) |  |  |

TABLE 10-continued

Example 4

| Lens group | Surface No. | Ri | Di | Ndi | vdi |
|---|---|---|---|---|---|
| GR2 | 4(ASP) | 70.751 | 0.080 | 1.55290 | 45.00 |
|  | 5 | 57.333 | 1.200 | 1.74690 | 49.22 |
|  | 6 | 12.936 | 7.115 |  |  |
|  | 7 | −110.542 | 0.900 | 1.80932 | 39.64 |
|  | 8 | 68.057 | 0.500 |  |  |
|  | 9 | 33.413 | 3.284 | 1.85505 | 23.78 |
|  | 10 | −86.602 | 1.082 |  |  |
|  | 11(ASP) | −31.260 | 0.900 | 1.81081 | 40.73 |
|  | 12 | −74.085 | (D12) |  |  |
| GR3 | 13(ASP) | 190.058 | 2.413 | 1.59412 | 67.02 |
|  | 14(ASP) | −37.646 | 2.500 |  |  |
|  | 15 (aperture stop) | Infinity | 1.500 |  |  |
|  | 16 | 17.031 | 3.065 | 1.59489 | 68.62 |
|  | 17 | 23.462 | 4.305 |  |  |
|  | 18 | −41.951 | 0.800 | 1.91048 | 31.31 |
|  | 19 | 20.801 | 2.916 | 1.56605 | 60.83 |
|  | 20 | 2967.397 | 1.708 |  |  |
|  | 21(ASP) | 30.335 | 5.837 | 1.69980 | 55.46 |
|  | 22(ASP) | −20.841 | (D22) |  |  |
| GR4 | 23 | 251.633 | 1.362 | 1.65222 | 33.84 |
|  | 24 | −748.375 | 0.700 | 1.59412 | 67.02 |
|  | 25(ASP) | 28.341 | (D25) |  |  |
|  | 26 | Infinity | 0.800 | 1.51872 | 64.20 |
|  | 27 | Infinity | (D27) |  |  |

TABLE 11

Example 4

| Surface No. | k | A4 | A6 | A8 | A10 |
|---|---|---|---|---|---|
| 4 | 0 | 9.5054E−06 | −3.4642E−08 | 7.7612E−11 | −1.6574E−13 |
| 11 | 0 | 6.7288E−06 | 5.4614E−08 | −3.6404E−10 | 2.3257E−12 |
| 13 | 0 | −2.1186E−05 | −7.3634E−08 | 1.6904E−09 | −1.1643E−11 |
| 14 | 0 | −1.7597E−05 | −5.0603E−08 | 1.3252E−09 | −9.7048E−12 |
| 21 | 0 | −2.9294E−05 | 8.1602E−08 | −5.0867E−10 | 1.0618E−12 |
| 22 | 0 | 1.7459E−05 | 1.1800E−08 | −5.7438E−11 | −3.0424E−13 |
| 25 | 0 | −2.9057E−06 | 1.1449E−08 | 1.9896E−10 | −1.0878E−12 |

TABLE 12

Example 4

| | Wide end | Intermediate | Telephoto end |
|---|---|---|---|
| Fno | 4.12 | 4.12 | 4.12 |
| f | 28.84 | 45.50 | 72.75 |
| ω | 37.33 | 24.58 | 15.87 |
| D3 | 1.000 | 15.544 | 27.008 |
| D12 | 15.059 | 6.673 | 1.500 |
| D22 | 6.419 | 5.821 | 2.000 |
| D24 | 7.198 | 7.795 | 11.616 |
| D26 | 26.058 | 33.214 | 47.652 |

Numerical Example 5

[Table 13] to [Table 15] show specific lens data corresponding to the zoom lens 5 according to the fifth configuration example shown in FIG. 5. In particular, [Table 13] shows basic lens data thereof, and [Table 14] shows data on aspheric surfaces. [Table 15] shows other data. In the zoom lens 5, each lens group traveled as magnification varied. Therefore, a value of a surface distance between adjacent lens groups was variable. Data of the variable surface distance is shown in [Table 15]. [Table 15] also shows values of Fno, f, and ω.

In the zoom lens 5, the second lens group GR2 included, in order from the object plane, the negative lens L21 configured of a negative meniscus lens with a convex surface facing toward the object plane and with a composite aspheric surface on the object plane side thereof, the negative lens L22 configured of a negative meniscus lens with a convex surface facing toward the object plane, the biconvex lens L23, and the negative lens L24 configured of a biconcave lens. The fourth lens group GR4 was configured of a cemented lens in which the positive lens L41A configured of a positive meniscus lens with a convex surface facing toward the object plane and the negative lens L41B configured of a negative meniscus lens with a convex surface facing toward the object plane and with an aspheric surface on the image plane side thereof were attached to each other. Basic shapes of other lens groups were similar to those in the zoom lens 1 according to the above-described first configuration example. Also in the zoom lens 5, image blur is compensatable through moving the positive lens L31 located closest to the object plane or moving the positive lens L35 located closest to the image plane in the third lens group GR3 in a direction perpendicular to the optical axis Z1.

TABLE 13

Example 5

| Lens group | Surface No. | Ri | Di | Ndi | νdi |
|---|---|---|---|---|---|
| GR1 | 1 | 44.504 | 1.800 | 1.85505 | 23.78 |
| | 2 | 35.768 | 10.116 | 1.59489 | 68.62 |
| | 3 | 189.942 | (D3) | | |
| GR2 | 4 (ASP) | 49.600 | 0.080 | 1.55290 | 45.00 |
| | 5 | 46.448 | 1.200 | 1.74690 | 49.22 |
| | 6 | 12.397 | 7.119 | | |
| | 7 | 3632.760 | 0.900 | 1.80932 | 39.64 |
| | 8 | 54.713 | 0.500 | | |
| | 9 | 29.575 | 3.329 | 1.85505 | 23.78 |
| | 10 | −118.037 | 0.832 | | |
| | 11 (ASP) | −37.064 | 0.900 | 1.81081 | 40.73 |
| | 12 | 801.926 | (D12) | | |
| GR3 | 13 (ASP) | 153.826 | 2.380 | 1.59412 | 67.02 |
| | 14 (ASP) | −38.249 | 2.500 | | |
| | 15 (aperture stop) | Infinity | 1.500 | | |
| | 16 | 16.616 | 3.246 | 1.59489 | 68.62 |
| | 17 | 21.658 | 3.805 | | |
| | 18 | −38.974 | 0.800 | 1.91048 | 31.31 |
| | 19 | 23.944 | 2.151 | 1.56605 | 60.83 |
| | 20 | 89.973 | 0.977 | | |
| | 21 (ASP) | 30.267 | 5.318 | 1.69980 | 55.46 |
| | 22 (ASP) | −20.005 | (D22) | | |
| GR4 | 23 | 73.702 | 1.500 | 1.65222 | 33.84 |
| | 24 | 85.267 | 1.000 | 1.55516 | 71.68 |
| | 25 (ASP) | 30.348 | (D25) | | |
| | 26 | Infinity | 0.800 | 1.51872 | 64.20 |
| | 27 | Infinity | (D27) | | |

TABLE 14

Example 5

| Surface No. | k | A4 | A6 | A8 | A10 |
|---|---|---|---|---|---|
| 4 | 0 | 5.0726E−06 | −2.0642E−08 | 7.2432E−12 | −7.7243E−14 |
| 11 | 0 | 1.2448E−05 | 6.2641E−08 | −4.1464E−10 | 3.7288E−12 |
| 13 | 0 | −2.0141E−05 | −7.4148E−08 | 1.9449E−09 | −1.8742E−11 |
| 14 | 0 | −1.6500E−05 | −4.6958E−08 | 1.5115E−09 | −1.5571E−11 |
| 21 | 0 | −3.5243E−05 | 9.4732E−08 | −4.4411E−10 | 9.3763E−13 |
| 22 | 0 | 1.2332E−05 | 1.1967E−08 | 1.2937E−10 | −5.5967E−13 |
| 25 | 0 | −2.2276E−06 | 2.1247E−08 | 3.0216E−11 | −2.0737E−13 |

TABLE 15

Example 5

|  | Wide end | Intermediate | Telephoto end |
|---|---|---|---|
| Fno | 4.12 | 4.12 | 4.12 |
| f | 28.84 | 45.50 | 72.75 |
| ω | 37.34 | 24.50 | 15.87 |
| D3 | 1.000 | 14.720 | 26.574 |
| D12 | 15.119 | 6.859 | 1.500 |
| D22 | 8.134 | 7.985 | 2.000 |
| D25 | 7.994 | 8.143 | 14.128 |
| D27 | 25.000 | 32.512 | 46.265 |

Numerical Example 6

Figure 6:
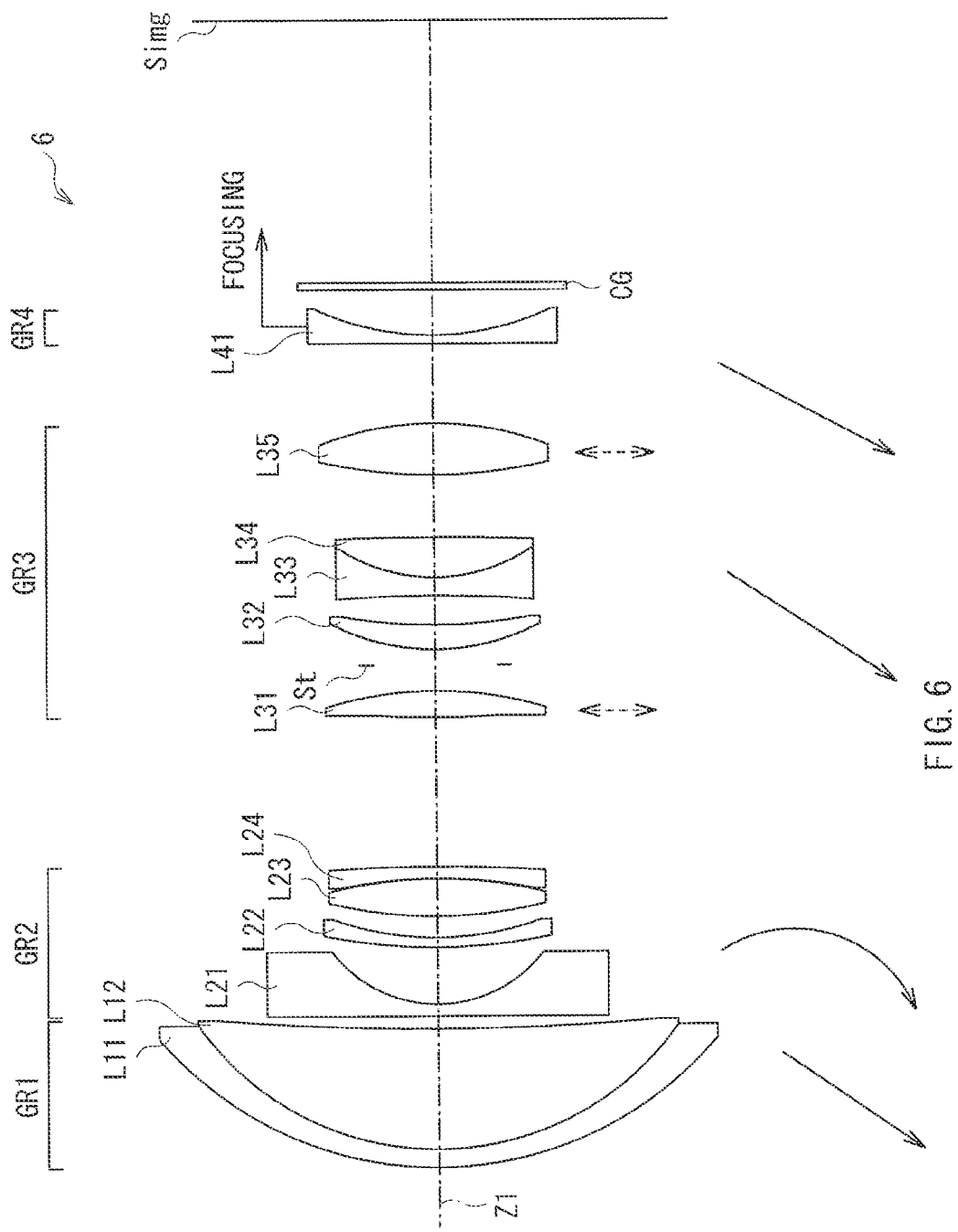
FIG. 6 is a lens cross-sectional view illustrating a sixth configuration example of the zoom lens and corresponding to Numerical Example 6.

[Table 16] to [Table 18] show specific lens data corresponding to the zoom lens 6 according to the sixth configuration example shown in FIG. 6. In particular, [Table 16] shows basic lens data thereof, and [Table 17] shows data on aspheric surfaces. [Table 18] shows other data. In the zoom lens 6, each lens group traveled as magnification varied. Therefore, a value of a surface distance between adjacent lens group was variable. Data of the variable surface distance is shown in [Table 18]. [Table 18] also shows values of Fno, f, and ω.

In the zoom lens 6, the second lens group GR2 included, in order from the object plane, the negative lens L21 configured of biconcave lens with a composite aspheric surface on the object plane side thereof, the negative lens L22 configured of a negative meniscus lens with a convex surface facing toward the object plane, the biconvex lens L23, and the negative lens L24 configured of a negative meniscus lens with a concave surface facing toward the object plane. The third lens group GR3 included, in order from the object plane, the positive lens L31, the aperture stop St, the positive meniscus lens L32 with a convex surface facing toward the object plane, the cemented lens in which the biconcave lens L33 and the positive lens L34 configured of a biconvex lens were attached to each other, and the positive lens L35. In the third lens group GR3, the positive lens L31 located closest to the object plane and the positive lens L35 located closest to the image plane were each a biconvex lens with aspheric surfaces formed on the both sides thereof. Basic shapes of other lens groups were similar to those in the zoom lens 1 according to the above-described first configuration example. Also in the zoom lens 6, image blur is compensatable through moving the positive lens L31 located closest to the object plane and the positive lens L35 located closest to the image plane in the third lens group GR3 in a direction perpendicular to the optical axis Z1.

TABLE 16

Example 6

| Lens group | Surface No. | Ri | Di | Ndi | vdi |
|---|---|---|---|---|---|
| GR1 | 1 | 34.281 | 1.800 | 1.85505 | 23.78 |
|  | 2 | 27.888 | 11.500 | 1.59489 | 68.62 |
|  | 3 | 260.211 | (D3) |  |  |
| GR2 | 4 (ASP) | −3219.046 | 0.080 | 1.55290 | 45.00 |
|  | 5 | −61635.696 | 1.200 | 1.74690 | 49.22 |
|  | 6 | 12.797 | 5.397 |  |  |
|  | 7 | 57.197 | 0.900 | 1.80932 | 39.64 |
|  | 8 | 28.006 | 2.103 |  |  |
|  | 9 | 41.176 | 3.468 | 1.85505 | 23.78 |
|  | 10 | −49.452 | 0.329 |  |  |
|  | 11 (ASP) | −33.398 | 0.900 | 1.81081 | 40.73 |
|  | 12 | −156.144 | (D12) |  |  |
| GR3 | 13 (ASP) | 185.038 | 2.384 | 1.59412 | 67.02 |
|  | 14 (ASP) | −40.649 | 2.500 |  |  |
|  | 15 (aperture stop) | Infinity | 1.500 |  |  |
|  | 16 | 20.649 | 2.323 | 1.59489 | 68.62 |
|  | 17 | 52.032 | 2.890 |  |  |
|  | 18 | −119.316 | 1.735 | 1.91048 | 31.31 |
|  | 19 | 16.855 | 3.788 | 1.56605 | 60.83 |
|  | 20 | −225.547 | 5.913 |  |  |
|  | 21 (ASP) | 43.004 | 5.067 | 1.69980 | 55.46 |
|  | 22 (ASP) | −26.269 | (D22) |  |  |
| GR4 | 23 | 524.309 | 0.800 | 1.59412 | 67.02 |
|  | 24 (ASP) | 25.353 | (D24) |  |  |
|  | 25 | Infinity | 0.800 | 1.51872 | 64.20 |
|  | 26 | Infinity | (D26) |  |  |

TABLE 17

Example 6

| Surface No. | k | A4 | A6 | A8 | A10 |
|---|---|---|---|---|---|
| 4 | 0 | 6.8108E−06 | −5.7195E−08 | 1.8479E−10 | −2.5225E−13 |
| 11 | 0 | 2.1365E−05 | 6.9001E−08 | −1.6842E−10 | 3.6450E−12 |
| 13 | 0 | −8.1564E−06 | −5.5404E−08 | 2.1681E−10 | −3.8413E−12 |
| 14 | 0 | −4.1785E−06 | −6.9610E−08 | 2.5169E−10 | −3.0975E−12 |
| 21 | 0 | −9.7456E−06 | 2.5936E−08 | 1.2365E−11 | −1.3988E−12 |
| 22 | 0 | 1.4533E−05 | −1.7531E−08 | 2.3724E−10 | −2.1936E−12 |
| 24 | 0 | −4.5516E−06 | 8.1942E−09 | 1.2006E−10 | −1.0893E−13 |

TABLE 18

Example 6

|  | Wide end | Intermediate | Telephoto end |
|---|---|---|---|
| Fno | 4.12 | 4.12 | 4.12 |
| f | 28.84 | 46.00 | 72.75 |
| ω | 38.38 | 24.13 | 15.80 |
| D3 | 1.200 | 9.989 | 14.305 |
| D12 | 14.490 | 8.026 | 1.500 |
| D22 | 7.578 | 4.907 | 2.000 |

TABLE 18-continued

Example 6

|  | Wide end | Intermediate | Telephoto end |
|---|---|---|---|
| D24 | 4.267 | 6.939 | 9.845 |
| D26 | 25.086 | 34.384 | 51.941 |

Numerical Example 7

Figure 7:
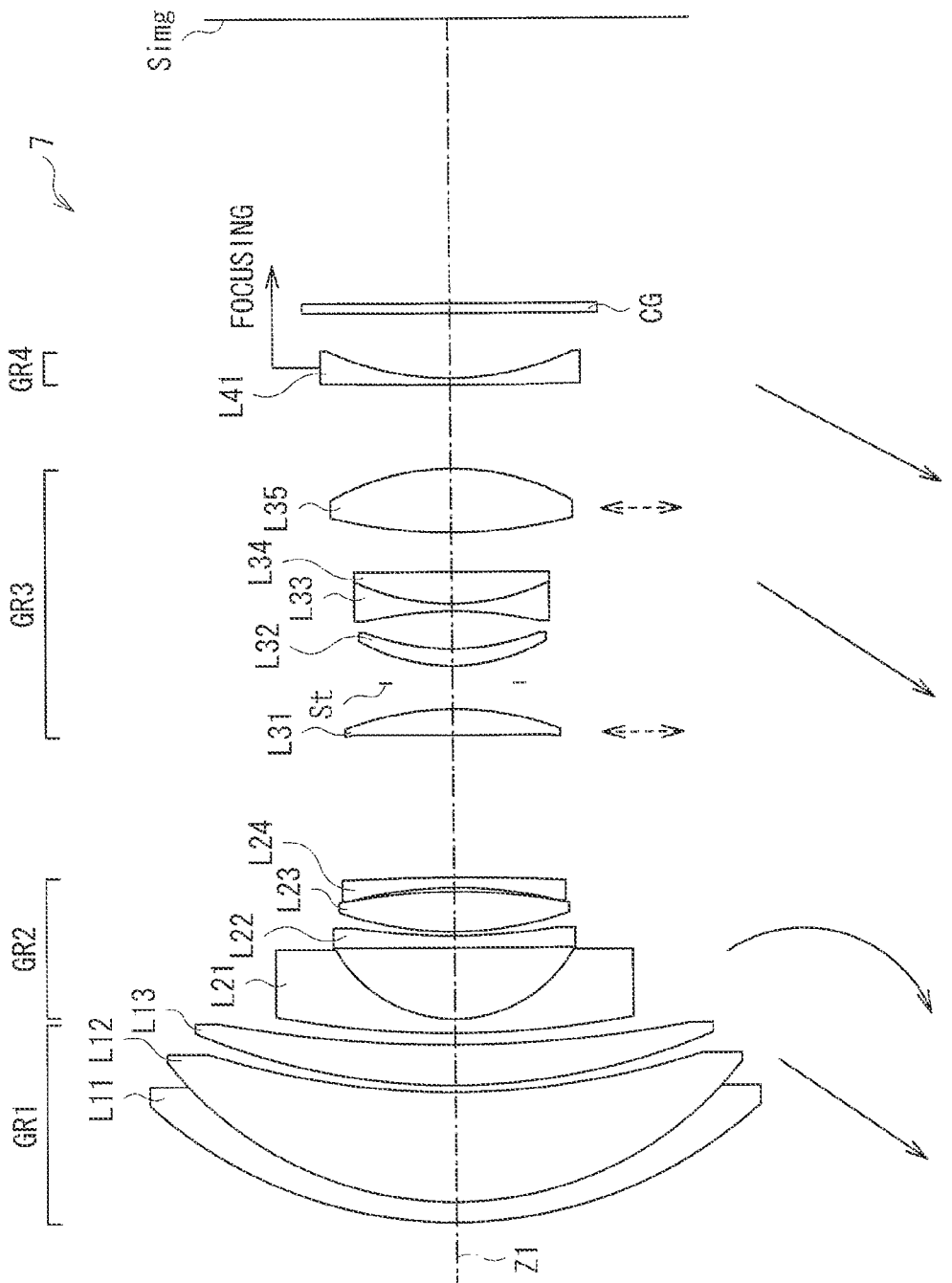
FIG. 7 is a lens cross-sectional view illustrating a seventh configuration example of the zoom lens and corresponding to Numerical Example 7.

[Table 19] to [Table 21] show specific lens data corresponding to the zoom lens 7 according to the seventh configuration example shown in FIG. 7. In particular, [Table 19] shows basic lens data thereof, and [Table 20] shows data on aspheric surfaces. [Table 21] shows other data. In the zoom lens 7, each lens group traveled as magnification varied. Therefore, a value of a surface distance between adjacent lens groups was variable. Data of the variable surface distance is shown in [Table 21]. [Table 21] also shows values of Fno, f, and ω.

In the zoom lens 7, the first lens group GR1 included, in order from the object plane, a cemented lens in which the negative lens L11 and the positive lens L12 were attached to each other, and a positive meniscus lens L13 with a convex surface facing toward the object plane. The negative lens L11 was a negative meniscus lens with a convex surface facing toward the object plane. The positive lens L12 was a positive meniscus lens with a convex surface facing toward the object plane. The second lens group GR2 included, in order from the object plane, the negative lens L21 configured of a negative meniscus lens with a convex surface facing toward the object plane and with a composite aspheric surface on the object plane side thereof, the negative lens L22 configured of a negative meniscus lens with a convex surface facing toward the object, the biconvex lens L23, and the negative lens L24 configured of a negative meniscus lens with a concave surface facing toward the object plane. The third lens group GR3 included, in order from the object plane, the positive lens L31, the aperture stop St, the positive meniscus lens L32 with a convex surface facing toward the object plane, the cemented lens in which the biconcave lens L33 and the positive lens L34 configured of a biconvex lens were attached to each other, and the positive lens L35. In the third lens group GR3, the positive lens L31 located closest to the object plane and the positive lens L35 located closest to the image plane were each configured of a biconvex lens with aspheric surfaces formed on the both sides thereof. Basic shapes of other lens groups were similar to those in the zoom lens 1 according to the above-described first configuration example. Also in the zoom lens 7, image blur is compensatable through moving the positive lens L31 located closest to the object plane or moving the positive lens L35 located closest to the image plane in the third lens group GR3 in a direction perpendicular to the optical axis Z1.

TABLE 19

Example 7

| Lens group | Surface No. | Ri | Di | Ndi | vdi |
|---|---|---|---|---|---|
| GR1 | 1 | 41.282 | 1.800 | 1.85505 | 23.78 |
|  | 2 | 32.676 | 10.099 | 1.59489 | 68.62 |
|  | 3 | 74.923 | 0.600 |  |  |
|  | 4 | 60.278 | 3.800 | 1.69980 | 55.46 |
|  | 5 | 119.305 | (D5) |  |  |
| GR2 | 6 (ASP) | 99.412 | 0.080 | 1.55290 | 45.00 |
|  | 7 | 87.483 | 1.200 | 1.74690 | 49.22 |
|  | 8 | 12.076 | 6.716 |  |  |
|  | 9 | −2366.580 | 0.900 | 1.80932 | 39.64 |
|  | 10 | 55.943 | 0.500 |  |  |
|  | 11 | 34.051 | 3.539 | 1.85505 | 23.78 |
|  | 12 | −53.349 | 0.471 |  |  |
|  | 13 (ASP) | −31.279 | 0.900 | 1.81081 | 40.73 |
|  | 14 | −199.904 | (D14) |  |  |
| GR3 | 15 (ASP) | 174.339 | 2.356 | 1.59412 | 67.02 |
|  | 16 (ASP) | −34.914 | 2.500 |  |  |
|  | 17 (aperture stop) | Infinity | 1.500 |  |  |
|  | 18 | 16.764 | 1.600 | 1.59489 | 68.62 |
|  | 19 | 24.520 | 3.281 |  |  |
|  | 20 | −43.782 | 0.800 | 1.91048 | 31.31 |
|  | 21 | 19.371 | 2.988 | 1.56605 | 60.83 |
|  | 22 | −341.217 | 3.407 |  |  |
|  | 23 (ASP) | 33.140 | 6.000 | 1.69980 | 55.46 |
|  | 24 (ASP) | −20.401 | (D24) |  |  |
| GR4 | 25 | 329.992 | 0.800 | 1.62518 | 58.16 |
|  | 26 (ASP) | 27.930 | (D26) |  |  |
|  | 27 | Infinity | 0.8 | 1.51872 | 64.20 |
|  | 28 | Infinity | (D28) |  |  |

TABLE 20

Example 7

| Surface No. | k | A4 | A6 | A8 | A10 |
|---|---|---|---|---|---|
| 6 | 0 | 1.0970E−05 | −5.1159E−08 | 1.1353E−10 | −2.0615E−13 |
| 13 | 0 | 1.5066E−05 | 8.2319E−08 | −6.0664E−10 | 5.8657E−12 |
| 15 | 0 | −2.9241E−05 | −1.4208E−07 | 2.3070E−09 | −2.4702E−11 |
| 16 | 0 | −2.4753E−05 | −9.9558E−08 | 1.5608E−09 | −1.9117E−11 |
| 23 | 0 | −2.6731E−05 | 6.2249E−08 | −4.1132E−10 | 6.0578E−13 |
| 24 | 0 | 1.8488E−05 | −8.6537E−10 | −1.9515E−11 | −6.4100E−13 |
| 26 | 0 | −2.6862E−06 | 1.5049E−09 | 2.4153E−10 | −1.2941E−12 |

TABLE 21

Example 7

|  | Wide end | Intermediate | Telephoto end |
|---|---|---|---|
| Fno | 4.12 | 4.12 | 4.12 |
| f | 28.84 | 45.50 | 72.75 |
| ω | 37.33 | 24.62 | 15.87 |
| D5 | 1.000 | 13.120 | 22.636 |
| D14 | 12.971 | 5.879 | 1.500 |

TABLE 21-continued

| | Example 7 | | |
|---|---|---|---|
| | Wide end | Intermediate | Telephoto end |
| D24 | 7.503 | 6.037 | 2.000 |
| D26 | 5.977 | 7.443 | 11.480 |
| D28 | 25.912 | 33.047 | 47.200 |

Numerical Example 8

[Table 22] to [Table 24] show specific lens data corresponding to the zoom lens 8 according to the eighth configuration example shown in FIG. 8. In particular, [Table 22] shows basic lens data thereof, and [Table 23] shows data on aspheric surfaces. [Table 24] shows other data. In the zoom lens 8, each lens group traveled as magnification varied. Therefore, a value of a surface distance between adjacent lens groups was variable. Data of the variable surface distance is shown in [Table 24]. [Table 24] also shows values of Fno, f, and ω.

In the zoom lens 8, the second lens group GR2 included, in order from the object plane, the negative lens L21 configured of a negative meniscus lens with a convex surface facing toward the object plane and with a composite aspheric surface on the object plane side thereof, the negative lens L22 configured of a negative meniscus lens with a convex surface facing toward the object plane, the biconvex lens L23, and the negative lens L24 configured of a negative meniscus lens with a concave surface facing toward the object plane. Basic shapes of other lens groups were similar to those in the zoom lens 1 according to the above-described first configuration example. In the zoom lens 8, image blur is compensatable through moving the positive lens L31 located closest to the object plane or moving the positive lens L35 located closest to the image plane in the third lens group GR3 in a direction perpendicular to the optical axis Z1.

TABLE 22

| | | Example 8 | | | |
|---|---|---|---|---|---|
| Lens group | Surface No. | Ri | Di | Ndi | vdi |
| GR1 | 1 | 41.739 | 2.011 | 1.85505 | 23.78 |
| | 2 | 33.883 | 9.288 | 1.59489 | 68.62 |
| | 3 | 81.860 | (D3) | | |
| GR2 | 4 (ASP) | 79.394 | 0.080 | 1.55290 | 45.00 |
| | 5 | 62.480 | 1.200 | 1.74690 | 49.22 |
| | 6 | 13.493 | 6.594 | | |
| | 7 | 40.836 | 0.900 | 1.80932 | 39.64 |
| | 8 | 32.167 | 0.500 | | |

TABLE 22-continued

| | | Example 8 | | | |
|---|---|---|---|---|---|
| Lens group | Surface No. | Ri | Di | Ndi | vdi |
| | 9 | 34.262 | 3.164 | 1.85505 | 23.78 |
| | 10 | 4834.575 | 2.086 | | |
| | 11 (ASP) | −32.954 | 1.157 | 1.81081 | 40.73 |
| | 12 | −71.450 | (D12) | | |
| GR3 | 13 (ASP) | 306.838 | 2.500 | 1.59412 | 67.02 |
| | 14 (ASP) | −35.558 | 2.500 | | |
| | 15 (aperture stop) | Infinity | 1.500 | | |
| | 16 | 22.319 | 4.000 | 1.59489 | 68.62 |
| | 17 | 44.040 | 6.166 | | |
| | 18 | −55.638 | 1.669 | 1.91048 | 31.31 |
| | 19 | 24.555 | 5.000 | 1.56605 | 60.83 |
| | 20 | 89.468 | 0.915 | | |
| | 21 (ASP) | 31.013 | 6.000 | 1.69980 | 55.46 |
| | 22 (ASP) | −23.519 | (D22) | | |
| GR4 | 23 | 283.954 | 2.593 | 1.59412 | 67.02 |
| | 24 (ASP) | 29.107 | (D24) | | |
| | 25 | Infinity | 0.800 | 1.51872 | 64.20 |
| | 26 | Infinity | (D26) | | |

TABLE 23

| | Example 8 | | | | |
|---|---|---|---|---|---|
| Surface No. | k | A4 | A6 | A8 | A10 |
| 4 | 0 | 1.5754E−05 | −3.9397E−08 | 5.2796E−11 | −1.1079E−13 |
| 11 | 0 | 1.2586E−05 | 9.0043E−08 | −5.0154E−10 | 3.7829E−12 |
| 13 | 0 | −1.6036E−05 | −1.1676E−07 | 1.2413E−09 | −9.5594E−12 |
| 14 | 0 | −1.3210E−05 | −8.7171E−08 | 8.5369E−10 | −7.5312E−12 |
| 21 | 0 | −2.2995E−05 | 6.6061E−08 | −4.4477E−10 | 8.0162E−13 |
| 22 | 0 | 1.3371E−05 | 1.8439E−08 | −1.1640E−10 | −3.4562E−13 |
| 24 | 0 | −1.1939E−06 | −6.8881E−09 | 2.7160E−10 | −1.1097E−12 |

TABLE 24

| | Example 8 | | |
|---|---|---|---|
| | Wide end | Intermediate | Telephoto end |
| Fno | 4.13 | 4.12 | 4.12 |
| f | 28.84 | 45.50 | 72.75 |
| ω | 37.34 | 24.70 | 15.93 |
| D3 | 1.000 | 18.024 | 32.597 |
| D12 | 21.082 | 8.663 | 1.500 |
| D22 | 3.599 | 4.516 | 2.000 |
| D24 | 7.707 | 6.790 | 9.306 |
| D26 | 25.000 | 32.501 | 47.291 |

[Other Numerical Data of Each Example]

[Table 25] summarizes values related to the above-described conditional expressions for each numerical example. As can be seen from [Table 25], the value of each numerical example is within the numerical range of each conditional expression.

TABLE 25

| Conditional expression | Example 1 | Example 2 | Example 3 | Example 4 |
|---|---|---|---|---|
| (R4f + R4r)/(R4f − R4r) | 1.01 | 2.00 | 3.00 | 1.25 |
| f4/fw | −1.49 | −2.59 | −3.37 | −1.90 |
| f1/fw | 3.32 | 3.69 | 3.89 | 3.70 |
| ν4n | 67.02 | 67.02 | 58.16 | 67.02 |
| Conditional expression | Example 5 | Example 6 | Example 7 | Example 8 |
| (R4f + R4r)/(R4f − R4r) | 2.40 | 1.10 | 1.18 | 1.23 |
| f4/fw | −3.35 | −1.56 | −1.69 | −1.90 |
| f1/fw | 3.75 | 2.50 | 3.12 | 5.40 |
| ν4n | 71.68 | 67.02 | 58.16 | 67.02 |

[Aberration Performance]

FIGS. 9A to 41C each show aberration performance of each numerical example. FIGS. 9A to 41C each show aberration in the condition that the infinite is in focus.

Figures 9A, 9B, 9C:
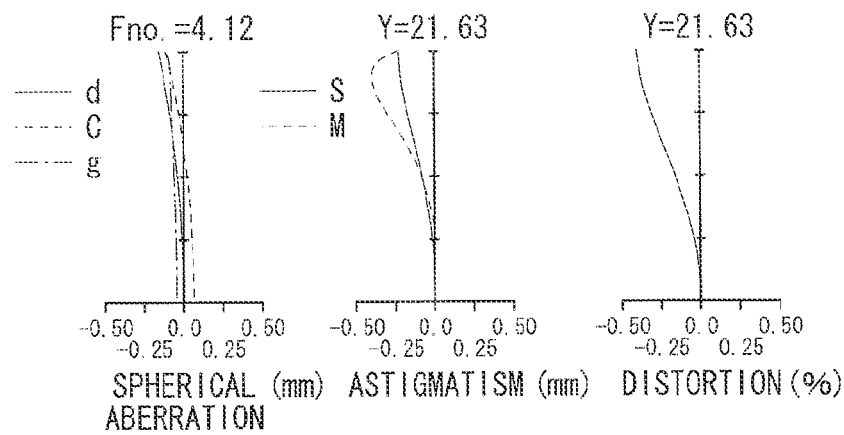
FIGS. 9A to 9C are aberration diagrams illustrating spherical aberration, astigmatism, and distortion, respectively, of the zoom lens corresponding to Numerical Example 1 at a short focal length end.
Figures 10A, 10B, 10C:
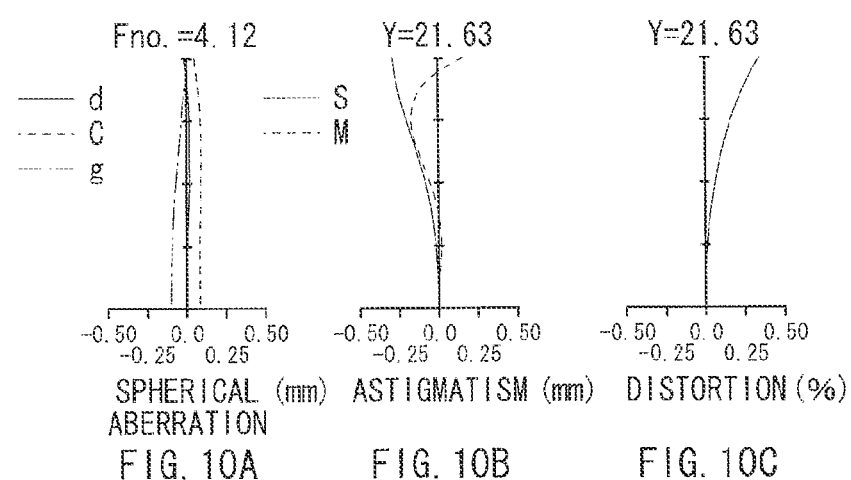
FIGS. 10A to 10C are aberration diagrams illustrating spherical aberration, astigmatism, and distortion, respectively, of the zoom lens corresponding to Numerical Example 1 in an intermediate focal length state.
Figures 11A, 11B, 11C:
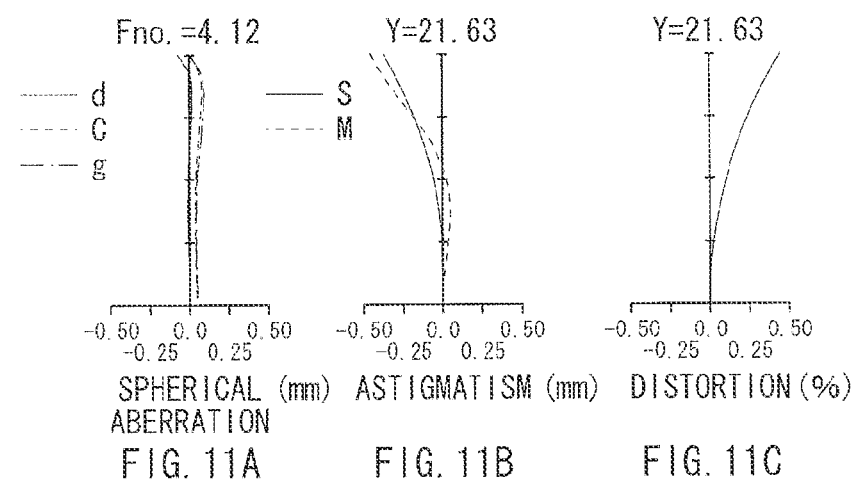
FIGS. 11A to 11C are aberration diagrams illustrating spherical aberration, astigmatism, and distortion, respectively, of the zoom lens corresponding to Numerical Example 1 at a long focal length end.

FIGS. 9A to 9C show spherical aberration, astigmatism, and distortion, respectively, of the zoom lens 1 corresponding to Numerical Example 1 at the wide end (at short focal length end). FIGS. 10A to 10C similarly show the respective kinds of aberration in the intermediate focal length state. FIGS. 11A to 11C similarly show the respective kinds of aberration at the telephoto end (at long focal length end). Each of the above-mentioned aberration diagrams shows aberration using the d line (587.6 nm) as a reference wavelength. The spherical aberration diagram also shows aberration of a g line (435.84 nm) and of a C line (656.28 nm). In the astigmatism diagram, S (solid line) indicates aberration in a sagittal direction and M (dashed line) indicates aberration in a meridional direction.

Similarly, FIGS. 21A to 41C show spherical aberration, astigmatism, and distortion of the zoom lenses 2 to 8 corresponding to Numerical Examples 2 to 8.

Figure 12:
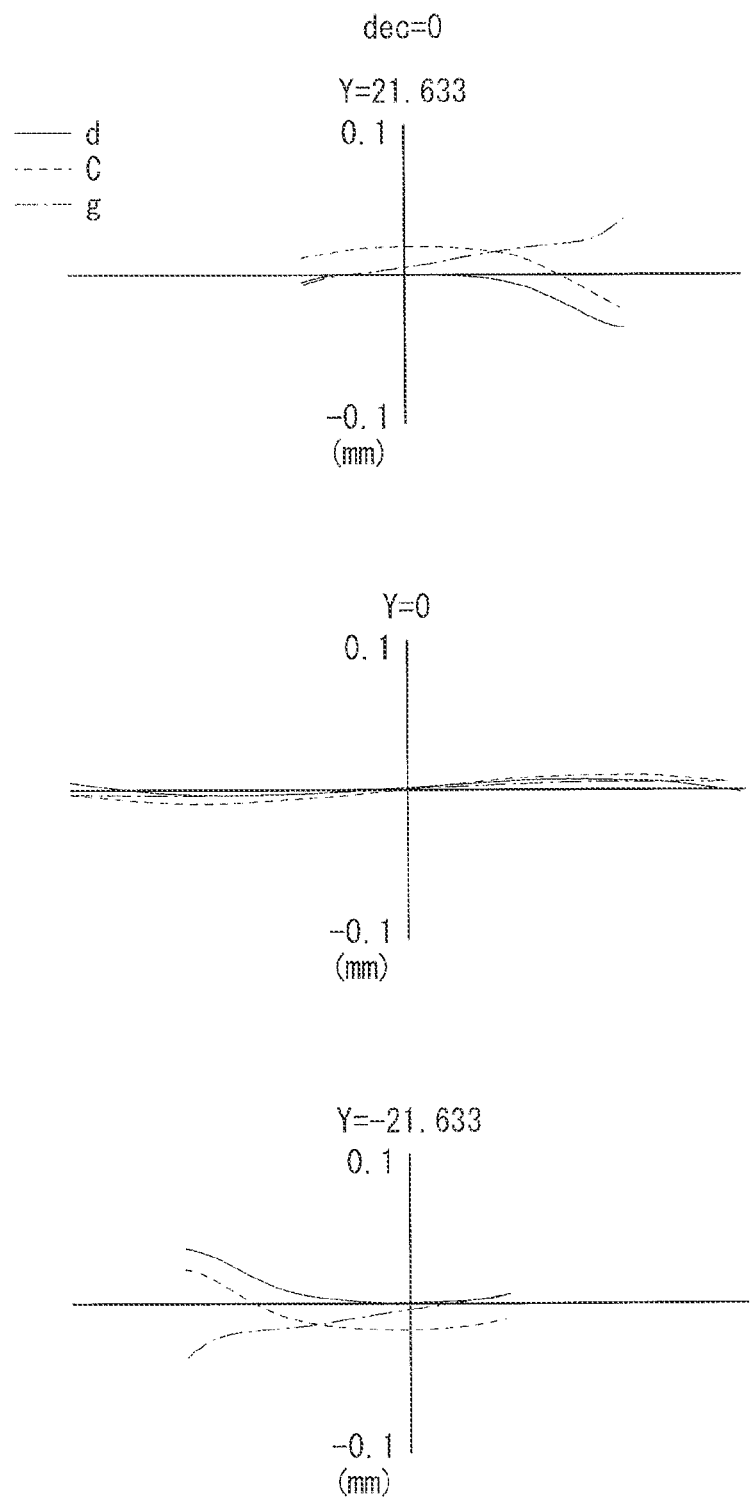
FIG. 12 is a lateral aberration diagram of the zoom lens corresponding to Numerical Example 1 at the short focal length end without compensating image blur.
Figure 13:
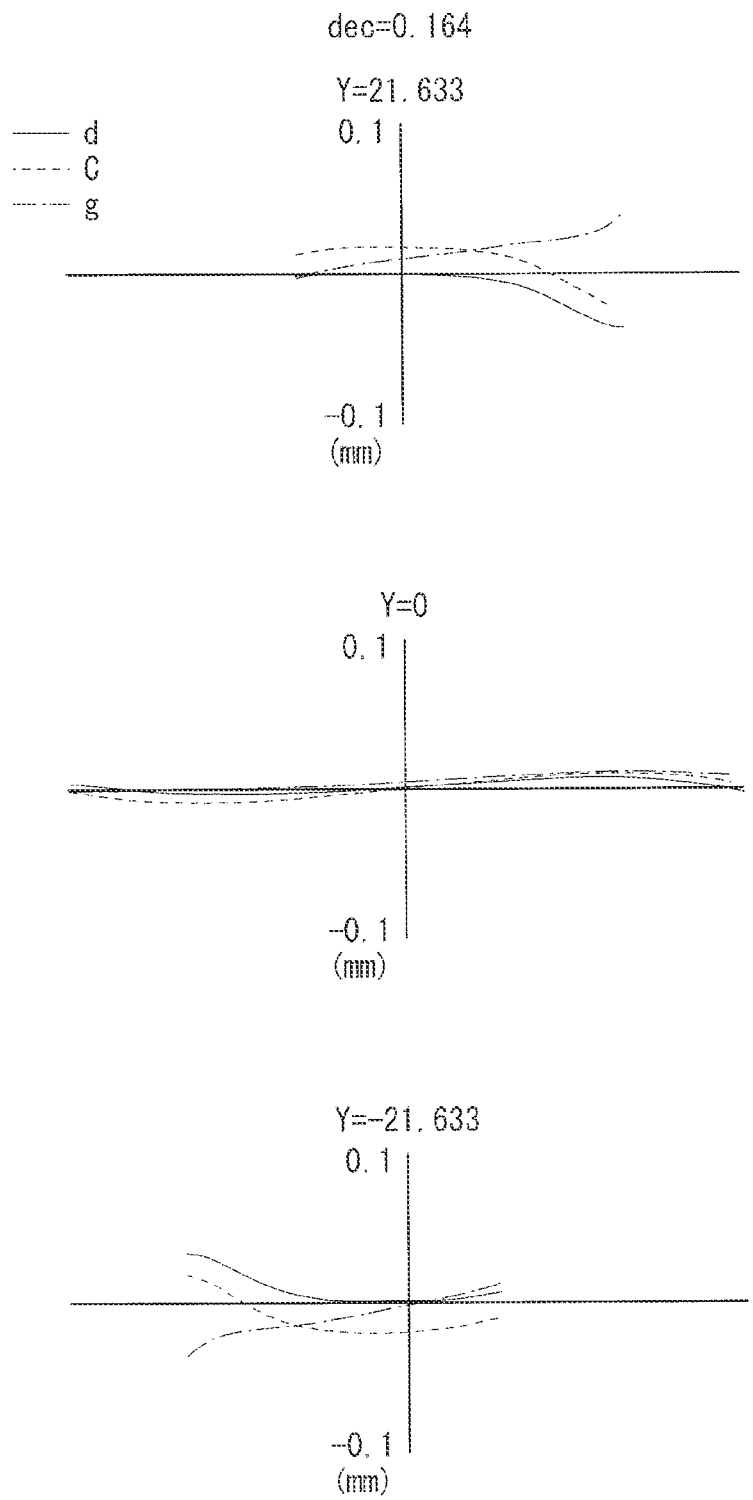
FIG. 13 is a lateral aberration diagram of the zoom lens corresponding to Numerical Example 1 at the short focal length end in a case where image blur is compensated by a positive lens located closest to object plane in a third lens group.
Figure 14:
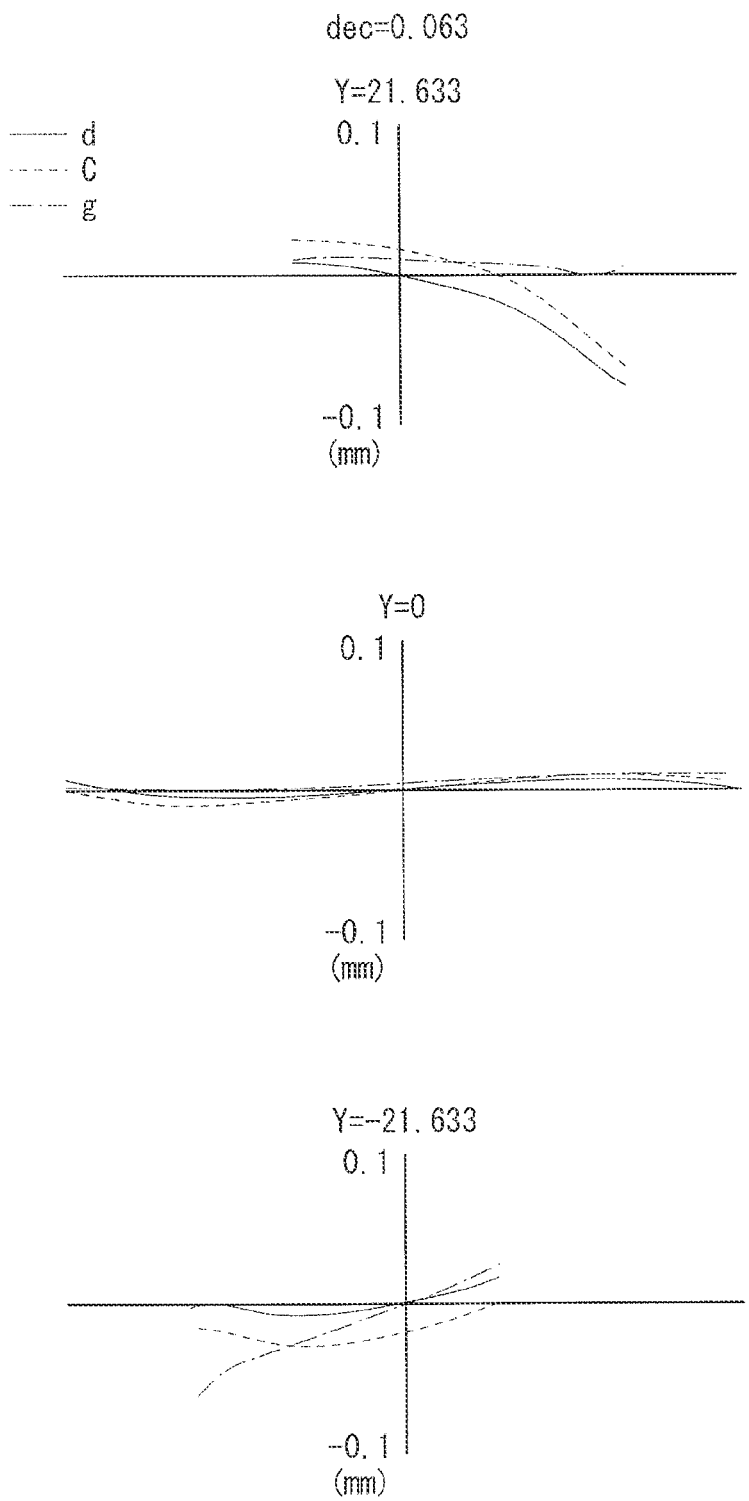
FIG. 14 is a lateral aberration diagram of the zoom lens corresponding to Numerical Example 1 at the short focal length end in a case where image blur is compensated by a positive lens located closest to image plane in the third lens group.

FIG. 12 illustrates lateral aberration without compensating image blur in the zoom lens 1 corresponding to Numerical Example 1 at the short focal length end. On the other hand, FIG. 13 illustrates lateral aberration in a case where image blur was compensated by the positive lens L31 located closest to the object plane in the third lens group GR3 in the zoom lens 1 at the short focal length end. Further, FIG. 14 illustrates lateral aberration in a case where image blur was compensated by the positive lens L35 located closest to the image plane in the third lens group GR3 in the zoom lens 1 at the short focal length end.

Figure 15:
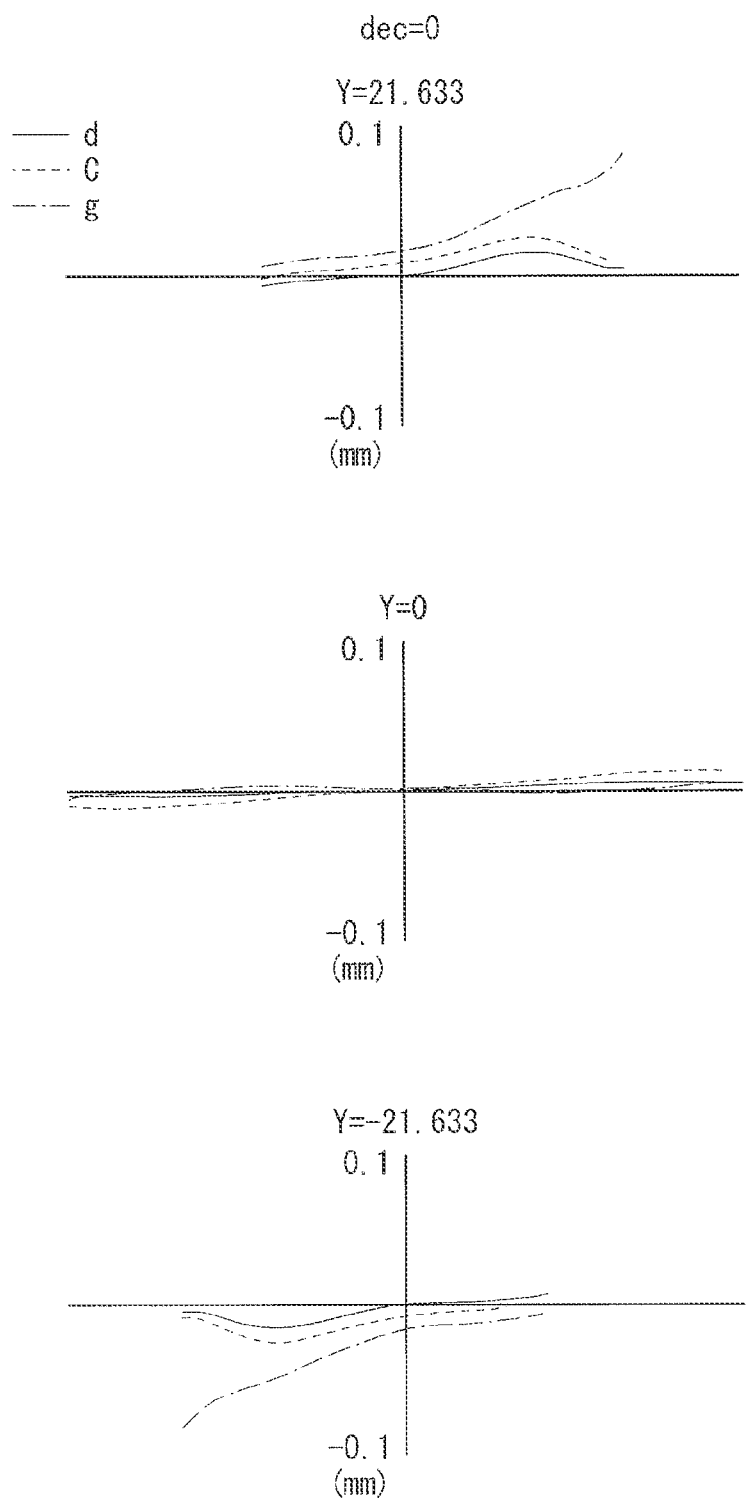
FIG. 15 is a lateral aberration diagram of the zoom lens corresponding to Numerical Example 1 in an intermediate focal length state without compensating image blur.
Figure 16:
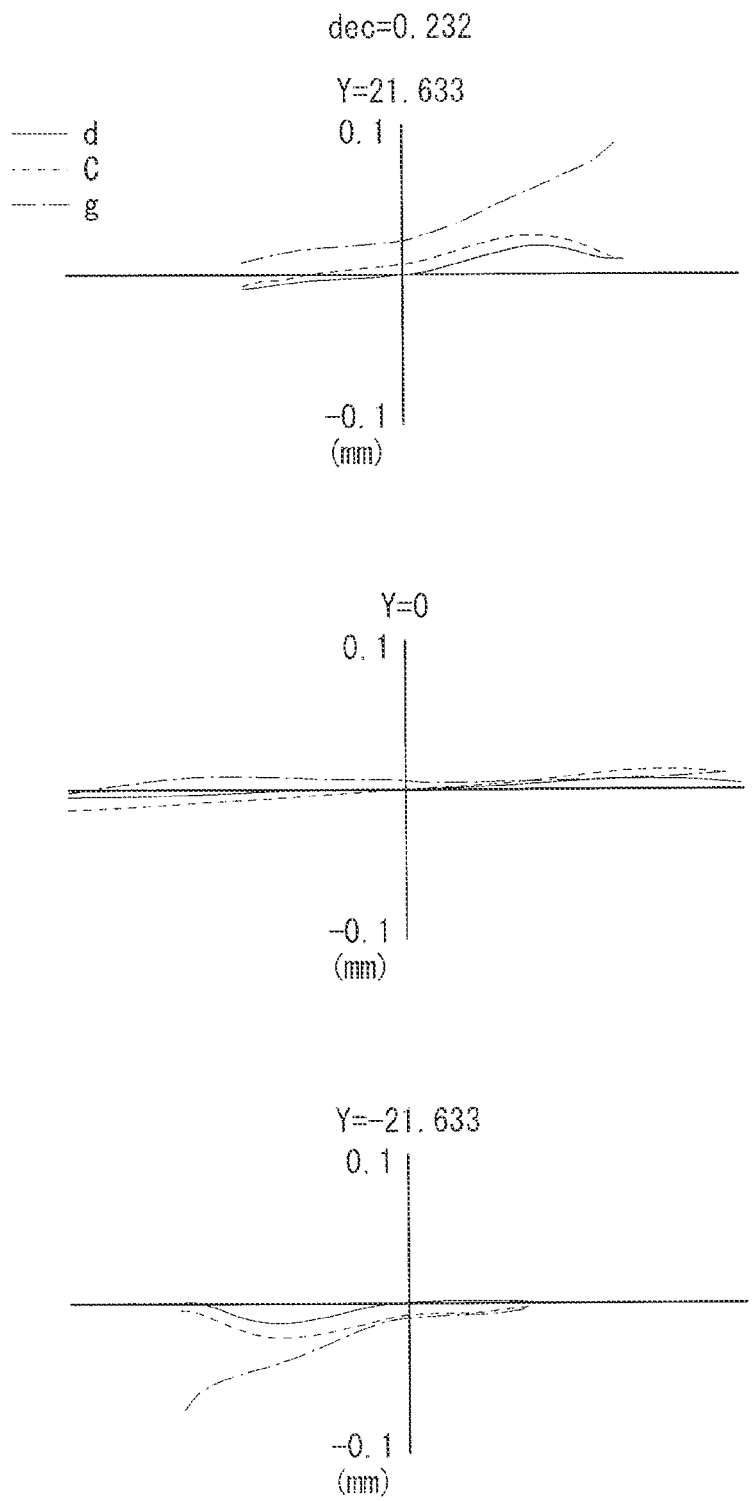
FIG. 16 is a lateral aberration diagram of the zoom lens corresponding to Numerical Example 1 in an intermediate focal length state in the case where image blur is compensated by the positive lens located closest to the object plane in the third lens group.
Figure 17:
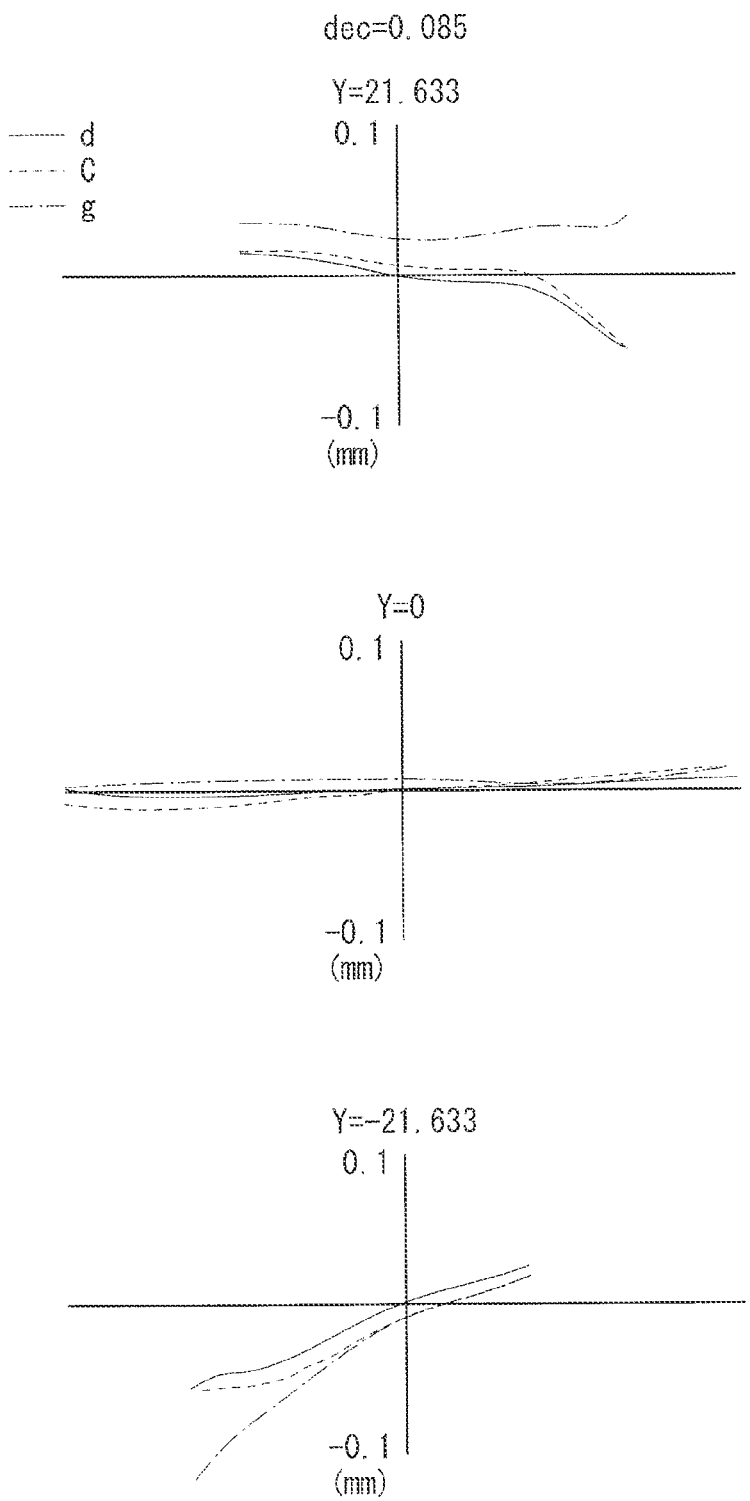
FIG. 17 is a lateral aberration diagram of the zoom lens corresponding to Numerical Example 1 in an intermediate focal length state in the case where image blur is compensated by the positive lens located closest to the image plane in the third lens group.

FIG. 15 illustrates lateral aberration without compensating image blur in the zoom lens 1 corresponding to Numerical Example 1 in the intermediate focal length state. On the other hand, FIG. 16 illustrates lateral aberration in a case where image blur was compensated by the positive lens L31 located closest to the object plane in the third lens group GR3 in the zoom lens 1 in an intermediate focal length state. Further, FIG. 17 illustrates lateral aberration in a case where image blur was compensated by the positive lens L35 located closest to the image plane in the third lens group GR3 in the zoom lens 1 in an intermediate focal length state.

Figure 18:
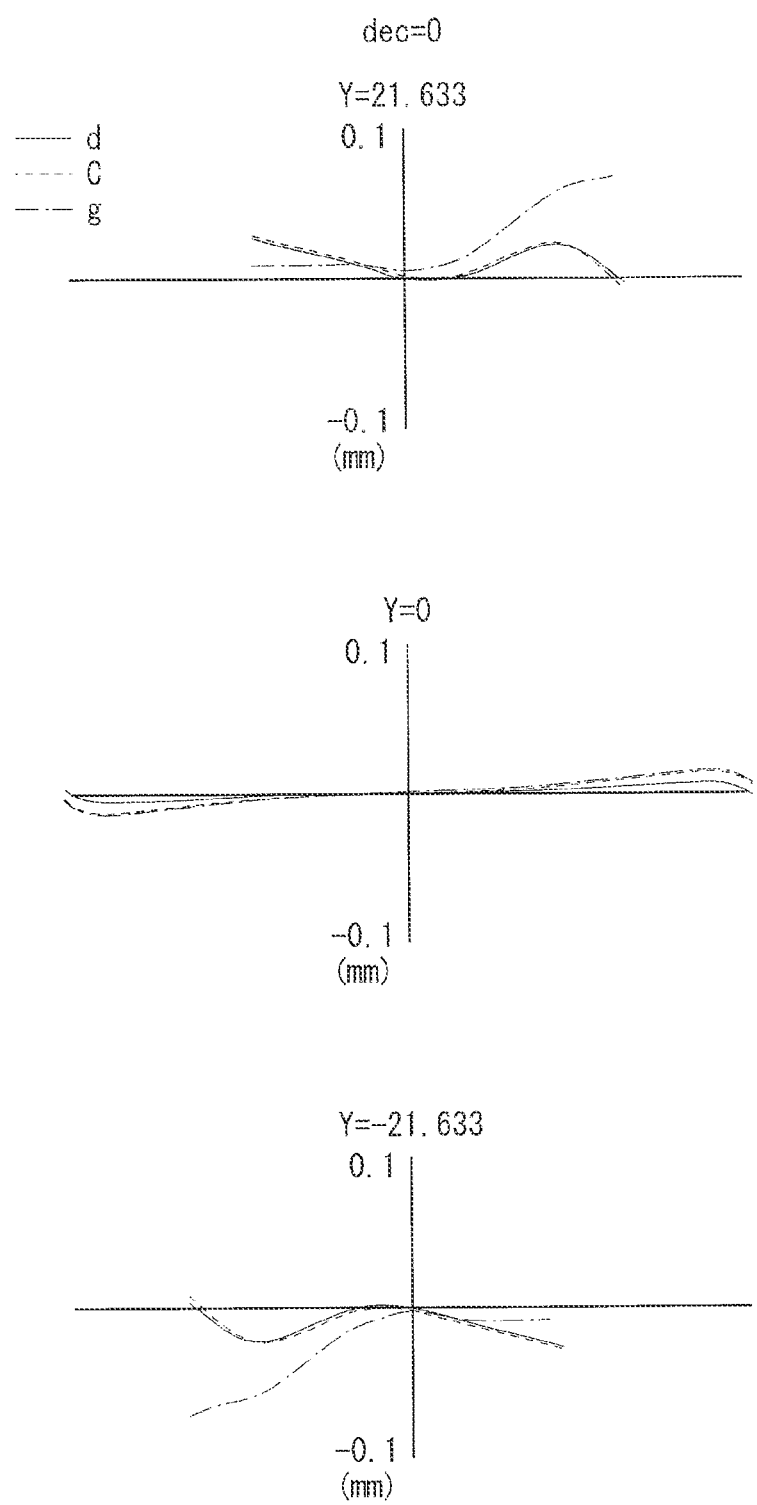
FIG. 18 is a lateral aberration diagram of the zoom lens corresponding to Numerical Example 1 at the long focal length end without compensating image blur.
Figure 19:
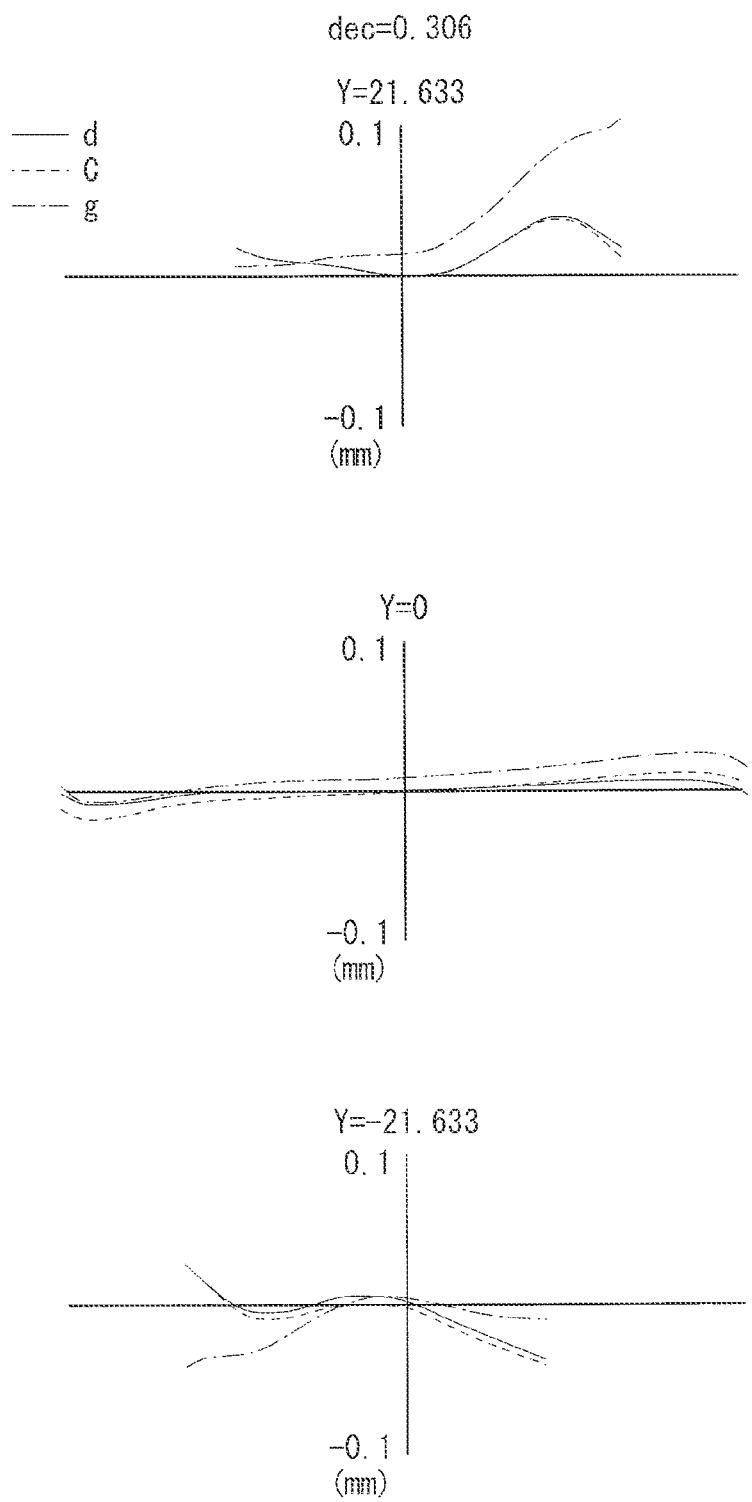
FIG. 19 is a lateral aberration diagram of the zoom lens corresponding to Numerical Example 1 at the long focal length end in the case where image blur is compensated by the positive lens located closest to the object plane in the third lens group.
Figures 21A, 21B, 21C:
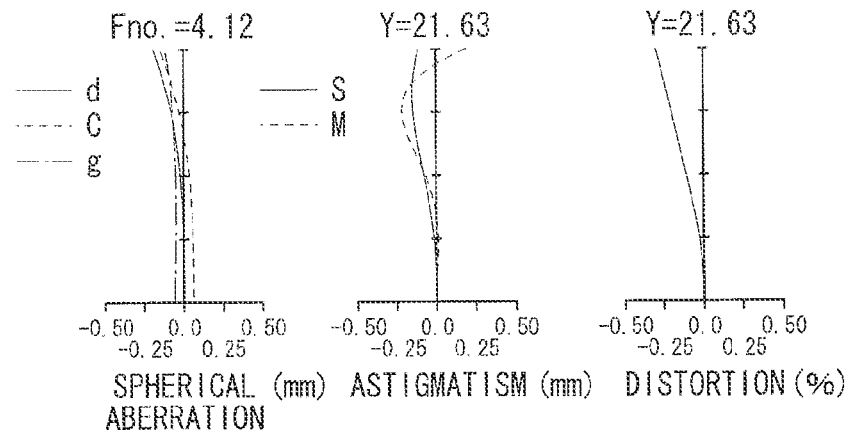
FIGS. 21A to 21C are aberration diagrams illustrating spherical aberration, astigmatism, and distortion, respectively, of the zoom lens corresponding to Numerical Example 2 at a short focal length end.
Figures 22A, 22B, 22C:
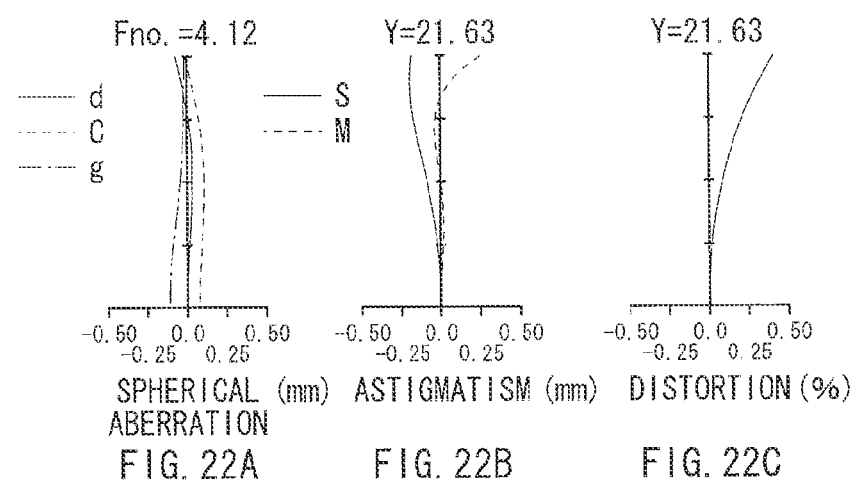
FIGS. 22A to 22C are aberration diagrams illustrating spherical aberration, astigmatism, and distortion, respectively, of the zoom lens corresponding to Numerical Example 2 in an intermediate focal length state.
Figures 23A, 23B, 23C:
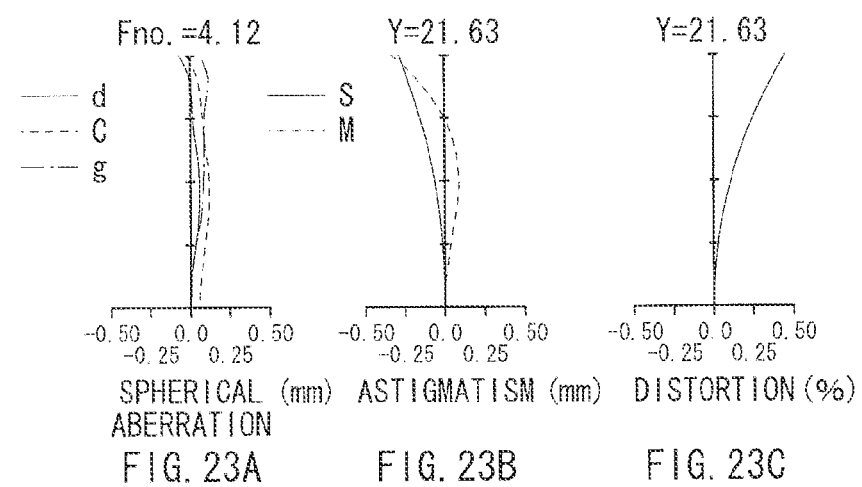
FIGS. 23A to 23C are aberration diagrams illustrating spherical aberration, astigmatism, and distortion, respectively, of the zoom lens corresponding to Numerical Example 2 at a long focal length end.
Figures 24A, 24B, 24C:
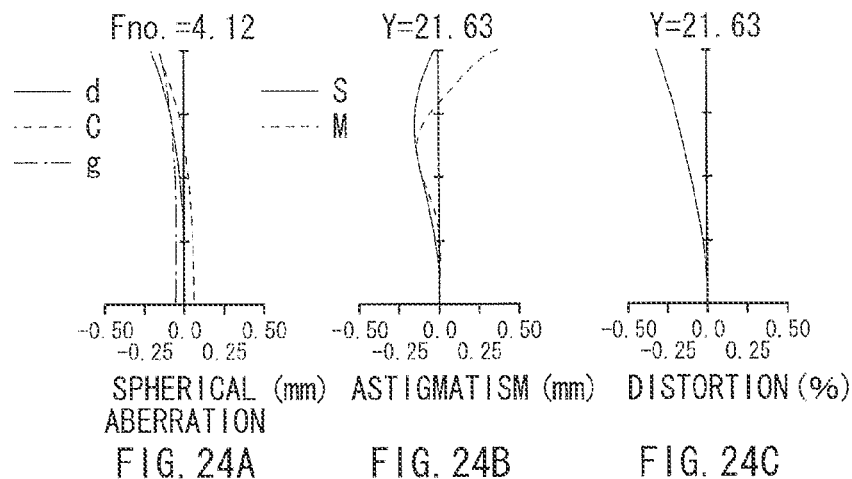
FIGS. 24A to 24C are aberration diagrams illustrating spherical aberration, astigmatism, and distortion, respectively, of the zoom lens corresponding to Numerical Example 3 at a short focal length end.
Figures 25A, 25B, 25C:
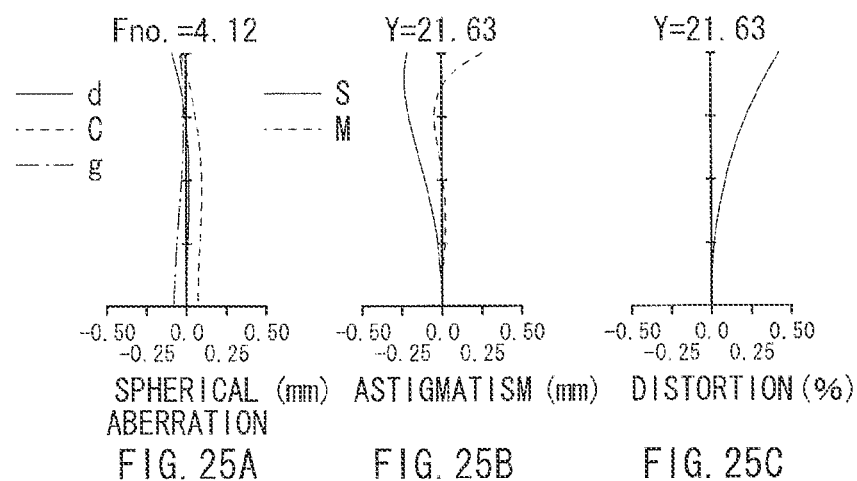
FIGS. 25A to 25C are aberration diagrams illustrating spherical aberration, astigmatism, and distortion, respectively, of the zoom lens corresponding to Numerical Example 3 in an intermediate focal length state.
Figures 26A, 26B, 26C:
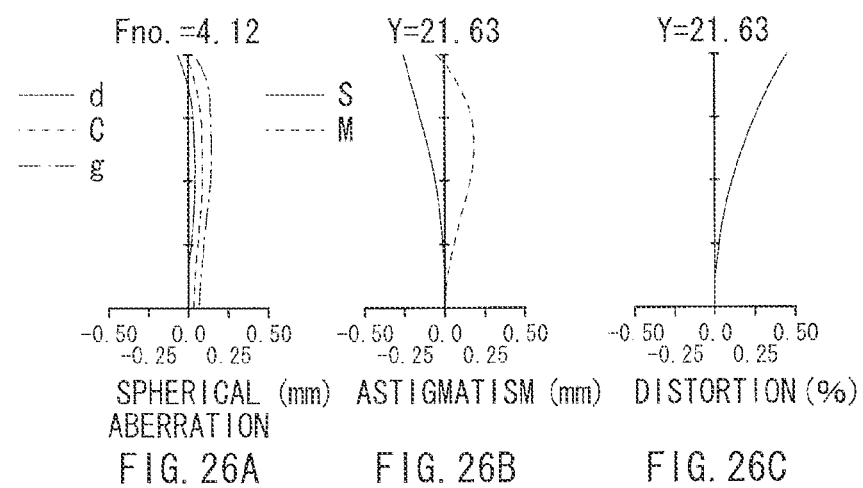
FIGS. 26A to 26C are aberration diagrams illustrating spherical aberration, astigmatism, and distortion, respectively, of the zoom lens corresponding to Numerical Example 3 at a long focal length end.
Figures 27A, 27B, 27C:
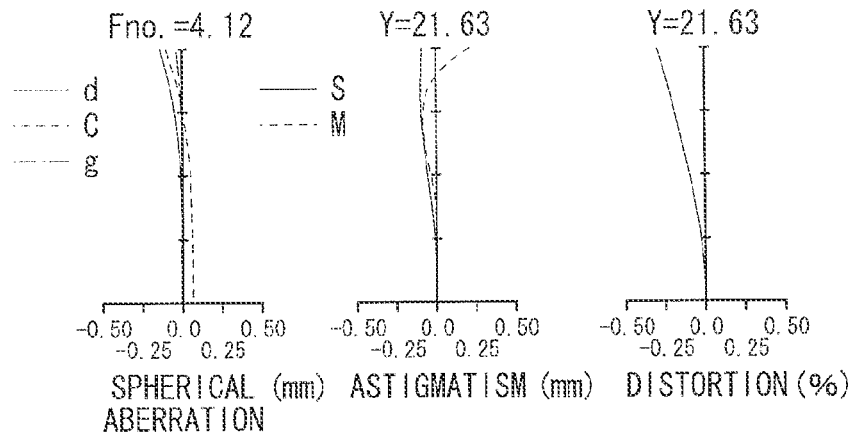
FIGS. 27A to 27C are aberration diagrams illustrating spherical aberration, astigmatism, and distortion, respectively, of the zoom lens corresponding to Numerical Example 4 at a short focal length end.
Figures 28A, 28B, 28C:
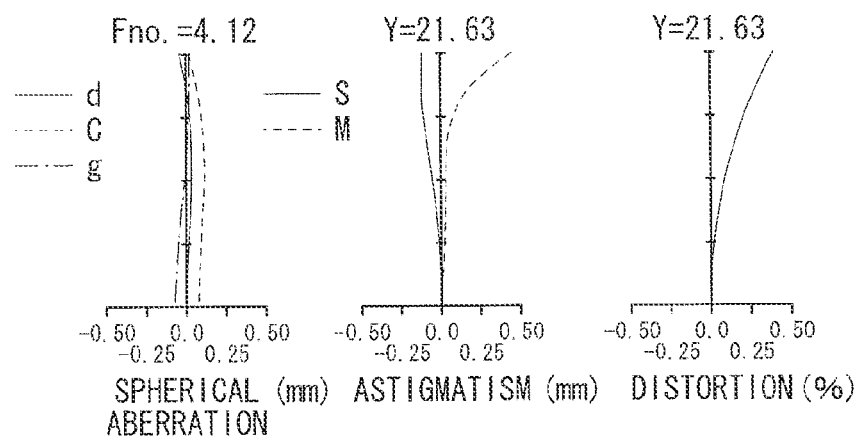
FIGS. 28A to 28C are aberration diagrams illustrating spherical aberration, astigmatism, and distortion, respectively, of the zoom lens corresponding to Numerical Example 4 in an intermediate focal length state.
Figures 29A, 29B, 29C:
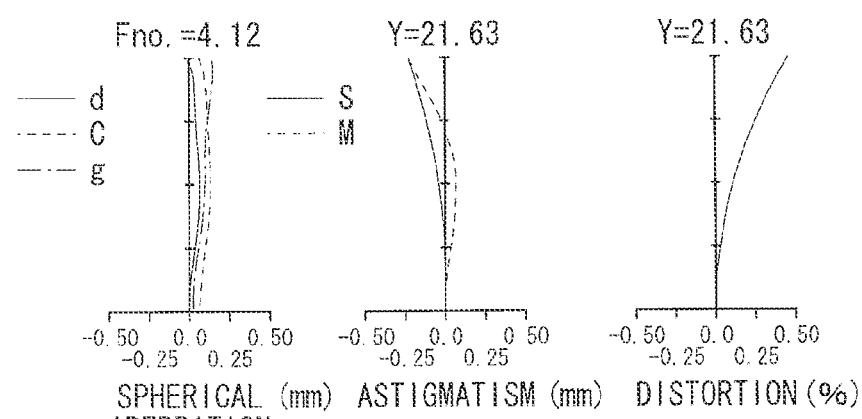
FIGS. 29A to 29C are aberration diagrams illustrating spherical aberration, astigmatism, and distortion, respectively, of the zoom lens corresponding to Numerical Example 4 at a long focal length end.
Figures 30A, 30B, 30C:
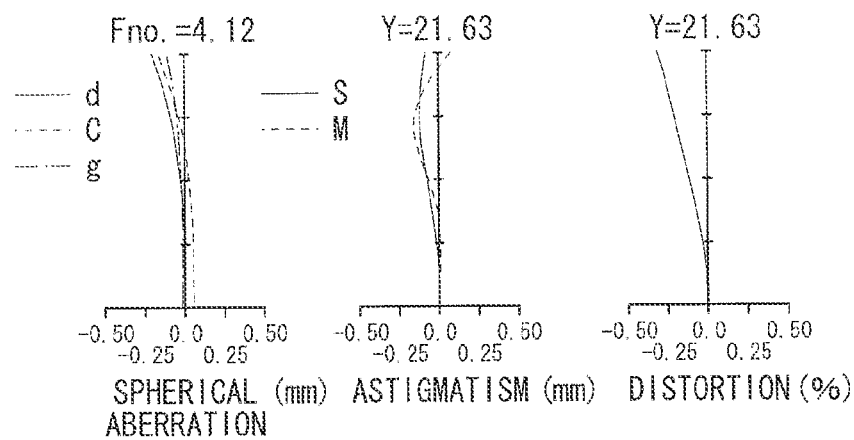
FIGS. 30A to 30C are aberration diagrams illustrating spherical aberration, astigmatism, and distortion, respectively, of the zoom lens corresponding to Numerical Example 5 at a short focal length end.
Figures 31A, 31B, 31C:
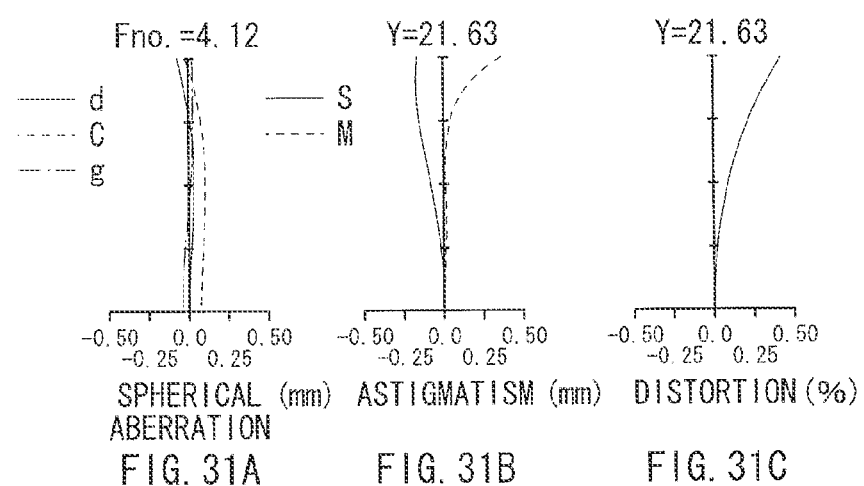
FIGS. 31A to 31C are aberration diagrams illustrating spherical aberration, astigmatism, and distortion, respectively, of the zoom lens corresponding to Numerical Example 5 in an intermediate focal length state.
Figures 32A, 32B, 32C:
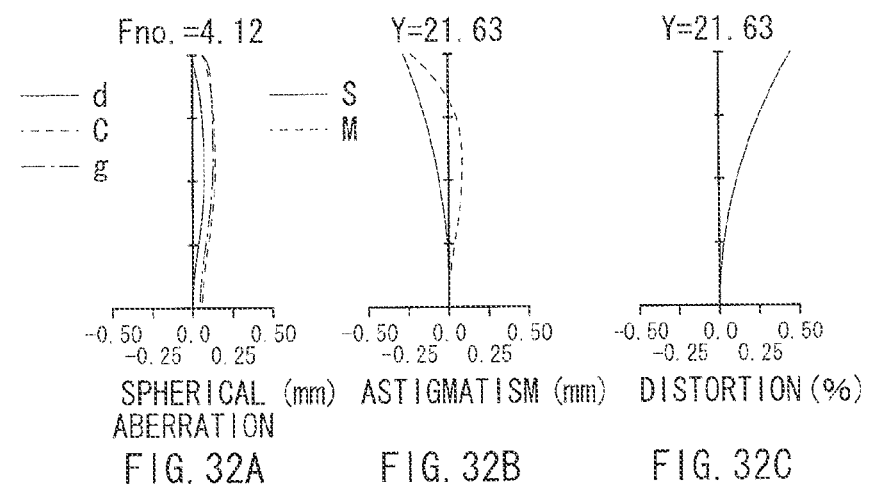
FIGS. 32A to 32C are aberration diagrams illustrating spherical aberration, astigmatism, and distortion, respectively, of the zoom lens corresponding to Numerical Example 5 at a long focal length end.
Figures 33A, 33B, 33C:
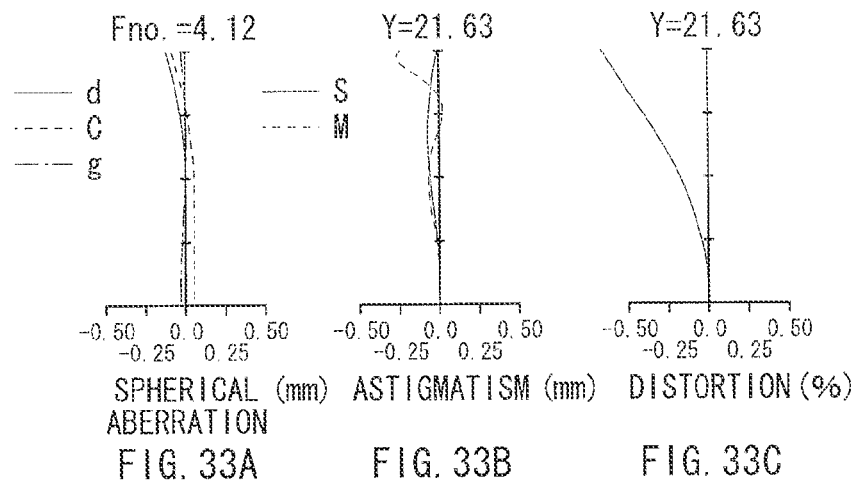
FIGS. 33A to 33C are aberration diagrams illustrating spherical aberration, astigmatism, and distortion, respectively, of the zoom lens corresponding to Numerical Example 6 at a short focal length end.
Figures 34A, 34B, 34C:
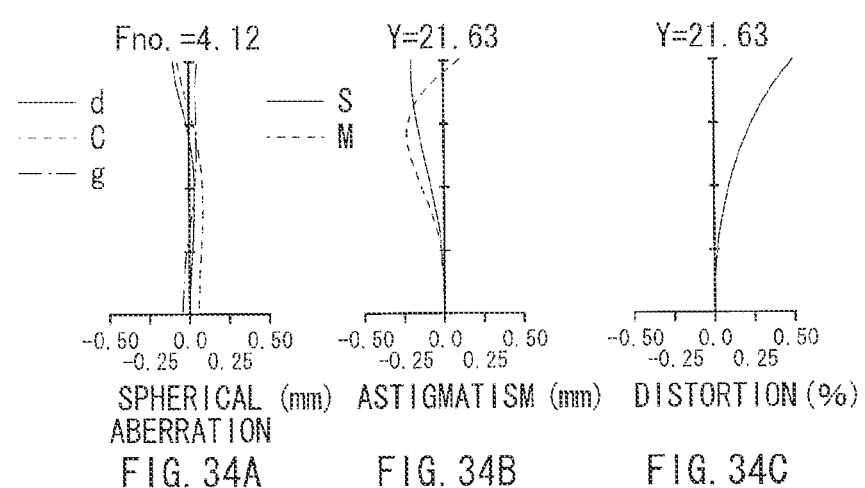
FIGS. 34A to 34C are aberration diagrams illustrating spherical aberration, astigmatism, and distortion, respectively, of the zoom lens corresponding to Numerical Example 6 in an intermediate focal length state.
Figures 35A, 35B, 35C:
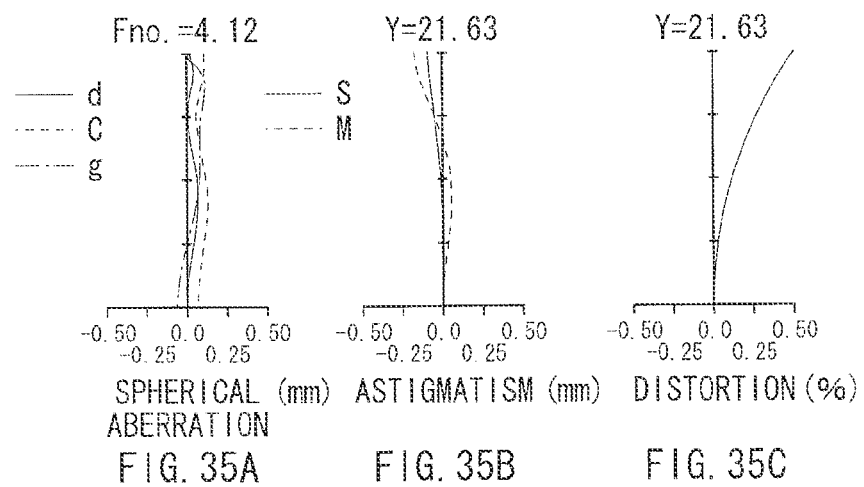
FIGS. 35A to 35C are aberration diagrams illustrating spherical aberration, astigmatism, and distortion, respectively, of the zoom lens corresponding to Numerical Example 6 at a long focal length end.
Figures 36A, 36B, 36C:
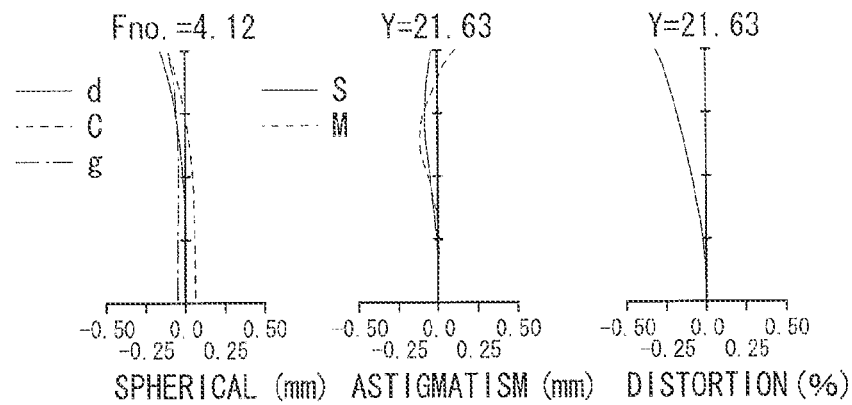
FIGS. 36A to 36C are aberration diagrams illustrating spherical aberration, astigmatism, and distortion, respectively, of the zoom lens corresponding to Numerical Example 7 at a short focal length end.
Figures 37A, 37B, 37C:
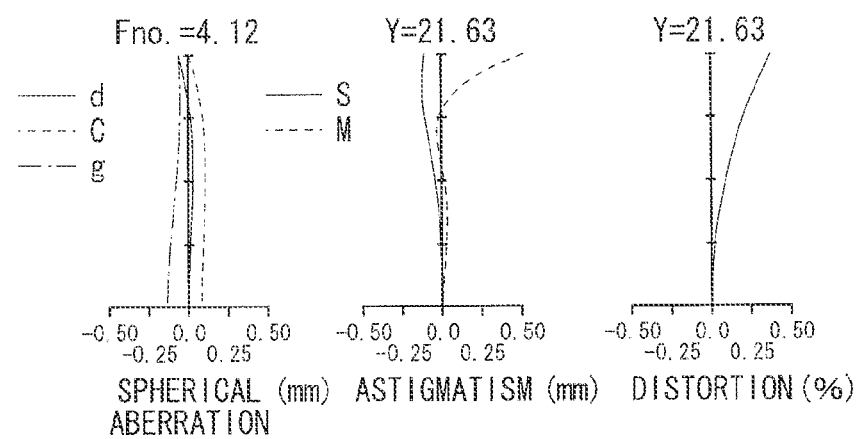
FIGS. 37A to 37C are aberration diagrams illustrating spherical aberration, astigmatism, and distortion, respectively, of the zoom lens corresponding to Numerical Example 7 in an intermediate focal length state.
Figures 38A, 38B, 38C:
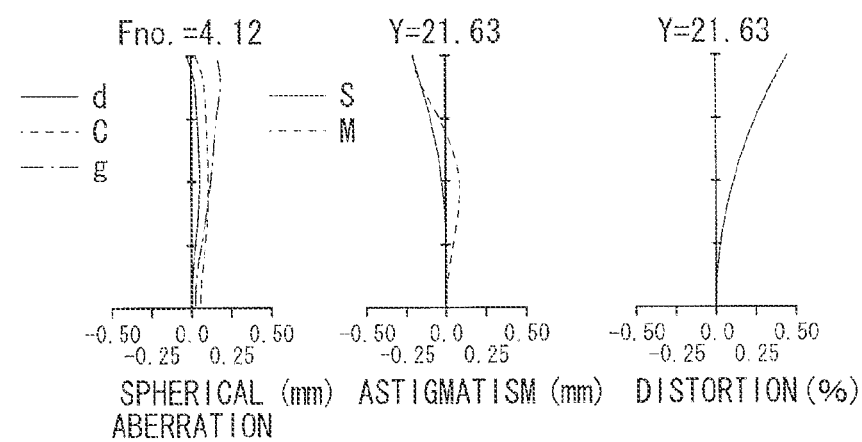
FIGS. 38A to 38C are aberration diagrams illustrating spherical aberration, astigmatism, and distortion, respectively, of the zoom lens corresponding to Numerical Example 7 at a long focal length end.
Figures 39A, 39B, 39C:
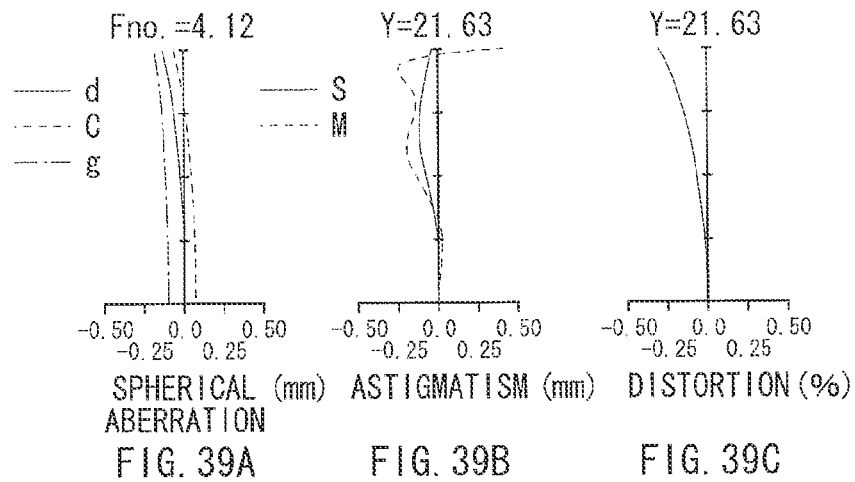
FIGS. 39A to 39C are aberration diagrams illustrating spherical aberration, astigmatism, and distortion, respectively, of the zoom lens corresponding to Numerical Example 8 at a short focal length end.
Figures 40A, 40B, 40C:
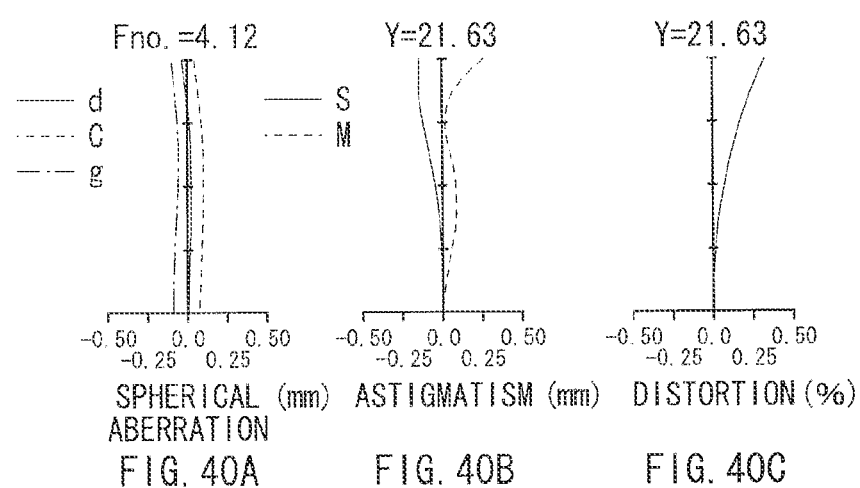
FIGS. 40A to 40C are aberration diagrams illustrating spherical aberration, astigmatism, and distortion, respectively, of the zoom lens corresponding to Numerical Example 8 in an intermediate focal length state.
Figures 41A, 41B, 41C:
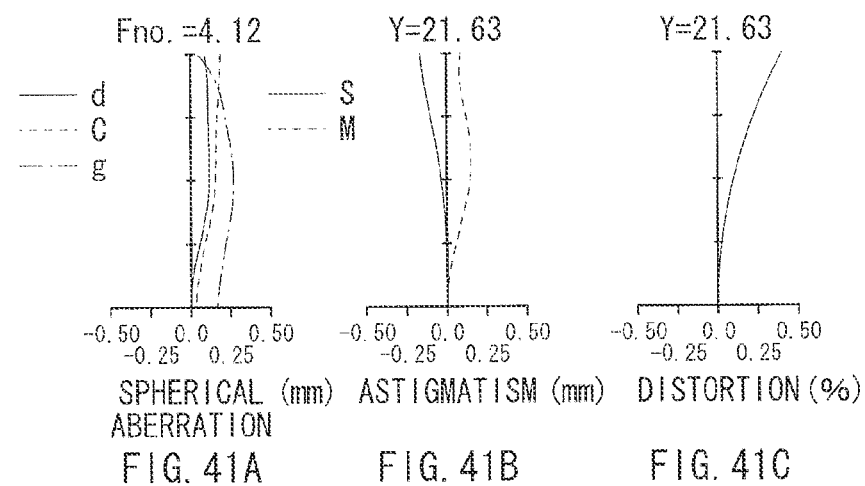
FIGS. 41A to 41C are aberration diagrams illustrating spherical aberration, astigmatism, and distortion, respectively, of the zoom lens corresponding to Numerical Example 8 at a long focal length end.

FIG. 18 illustrates lateral aberration without compensating image blur in the zoom lens 1 corresponding to Numerical Example 1 at the long focal length end. On the other hand, FIG. 19 illustrates lateral aberration in a case where image blur was compensated by the positive lens L31 located closest to the object plane in the third lens group GR3 in the zoom lens 1 at the long focal length end. Further, FIG. 20 illustrates lateral aberration in a case where image blur was compensated by the positive lens L35 located closest to the image plane in the third lens group GR3 in the zoom lens 1 at the long focal length end.

As can be seen from each of the aberration diagrams, a zoom lens with high imaging performance was achieved in each Example.

5. Other Embodiments

The technology according to the present disclosure is not limited to the description of the above embodiment and Examples, and may be variously modified. For example, the shape and the numerical values of each section described above in each Numerical Example are mere examples according to some example embodiments of the present technology, and are not to be construed as limitative of the technical scope of the present technology based thereon.

Moreover, description has been given of the configuration with four lens groups in the above-described embodiment and Examples. However, a configuration that further includes a lens with substantially no refractive power may be adopted.

It is possible to achieve at least the following configurations from the above-described example embodiments of the disclosure.

(1) A zoom lens including:
a first lens group having positive refractive power;
a second lens group having negative refractive power;
a third lens group having positive refractive power; and
a fourth lens group having negative refractive power, and configured of a single negative lens or of a cemented lens configured of a positive lens and a negative lens that are arranged in recited order from object plane toward image plane and are attached to each other, the first to fourth lens groups being arranged in recited order from the object plane toward the image plane, wherein a magnification-varying operation from wide end to telephoto end causes both the first lens group and the third lens group to travel toward the object plane and causes both the second lens group and the fourth lens group to travel along an optical axis, a focusing operation causes the fourth lens group to travel along the optical axis, and the following conditional expression is satisfied, $$0.7 < (R4f + R4r)/(R4f - R4r) < 5 \qquad (1)$$

where R4f is a radius of curvature of a most-object-sided optical surface in the fourth lens group, and R4r is a radius of curvature of a most-image-sided optical surface in the fourth lens group.

(2) The zoom lens according to (1), wherein the following conditional expression is satisfied, $$1.0 < (R4f + R4r)/(R4f - R4r) < 3.5 \qquad (1)'$$

(3) The zoom lens according to (1) or (2), wherein the following conditional expression is satisfied, $$-4.5 < f4/fw < -0.5 \qquad (2)$$

where fw is a focal length of whole of the zoom lens in a condition that infinite is in focus at the wide end, and f4 is a focal length of the fourth lens group.

(4) The zoom lens according to (3), wherein the following conditional expression is satisfied, $$-3.5 < f4/fw < -1.3 \qquad (2)'$$

(5) The zoom lens according to any one of (1) to (4), wherein the third lens group includes an aperture stop traveling together with the third lens group upon the magnification-varying operation.

(6) The zoom lens according to any one of (1) to (5), wherein the first lens group is configured of a cemented lens configured of a negative lens and a positive lens that are arranged in recited order from the object plane toward the image plane and are attached to each other.
(7) The zoom lens according to any one of (1) to (6), wherein the following conditional expression is satisfied, $$1.5 < f1/fw < 6.0 \quad (3)$$

where f1 is a focal length of the first lens group.
(8) The zoom lens according to (7), wherein the following conditional expression is satisfied, $$2.0 < f1/fw < 5.5 \quad (3)'$$

(9) The zoom lens according to any one of (1) to (8), wherein the following conditional expression is satisfied, $$v4n > 45 \quad (4)$$

where v4n is an Abbe number of the negative lens included in the fourth lens group.
(10) The zoom lens according to (9), wherein the following conditional expression is satisfied, $$v4n > 55 \quad (4)'$$

(11) The zoom lens according to any one of (1) to (10), wherein
the third lens group includes a plurality of lenses including one or more positive lenses, and
image blur is compensated through moving one of the one or more positive lenses, serving as an image blur compensation lens, in the third lens group in a direction perpendicular to the optical axis.
(12) The zoom lens according to (11), wherein the image blur compensation lens is arranged closest to the object plane in the third lens group.
(13) The zoom lens according to (11), wherein the image blur compensation lens is arranged closest to the image plane in the third lens group.
(14) The zoom lens according to any one of (1) to (13), further including
a lens having substantially no refractive power.
(15) An image pickup unit with a zoom lens and an image pickup device outputting an image pickup signal based on an optical image formed by the zoom lens, the zoom lens including:
a first lens group having positive refractive power;
a second lens group having negative refractive power;
a third lens group having positive refractive power; and
a fourth lens group having negative refractive power, and configured of a single negative lens or of a cemented lens configured of a positive lens and a negative lens that are arranged in recited order from object plane toward image plane and are attached to each other, the first to fourth lens groups being arranged in recited order from the object plane toward the image plane, wherein
a magnification-varying operation from wide end to telephoto end causes both the first lens group and the third lens group to travel toward the object plane and causes both the second lens group and the fourth lens group to travel along an optical axis,
a focusing operation causes the fourth lens group to travel along the optical axis, and
the following conditional expression is satisfied, $$0.7 < (R4f+R4r)/(R4f-R4r) < 5 \quad (1)$$

where R4f is a radius of curvature of a most-object-sided optical surface in the fourth lens group, and R4r is a radius of curvature of a most-image-sided optical surface in the fourth lens group.
(16) The image pickup unit according to (15), wherein the zoom lens further includes a lens having substantially no refractive power.

The present application contains subject matter related to that disclosed in Japanese Priority Patent Application JP 2012-061678 filed in the Japan Patent Office on Mar. 19, 2012, the entire content of which is hereby incorporated by reference.

It should be understood by those skilled in the art that various modifications, combinations, sub-combinations, and alterations may occur depending on design requirements and other factors insofar as they are within the scope of the appended claims or the equivalents thereof.

What is claimed is:
1. A zoom lens comprising:
a first lens group having positive refractive power;
a second lens group having negative refractive power;
a third lens group having positive refractive power; and
a fourth lens group having negative refractive power, and configured of a single negative lens or of a cemented lens configured of a positive lens and a negative lens that are arranged in recited order from object plane toward image plane and are attached to each other, the first to fourth lens groups being arranged in recited order from the object plane toward the image plane, wherein
a magnification-varying operation from wide end to telephoto end causes both the first lens group and the third lens group to travel toward the object plane and causes both the second lens group and the fourth lens group to travel along an optical axis,
a focusing operation causes the fourth lens group to travel along the optical axis, and
wherein the following first conditional expression is satisfied,

$$A < (R4f+R4r)/(R4f-R4r) < B \quad (1)$$

where R4f is a radius of curvature of a most-object-sided optical surface in the fourth lens group, R4r is a radius of curvature of a most-image-sided optical surface in the fourth lens group, A is a number selected from the expression 0.7≤A≤1.0 and B is a number selected from the expression 3.5≤B≤5;
wherein the following second conditional expression is satisfied, $$M < f4/fw < N \quad (2)$$

where fw is a focal length of whole of the zoom lens in a condition that infinite is in focus at the wide end, f4 is a focal length of the fourth lens group, M is a number selected from the expression −4.5≤M≤−3.5 and N is a number selected from the expression −1.3≤N≤−0.5; and
wherein the following third conditional expression is satisfied, $$X < f1/fw < Y \quad (3)$$

where f1 is a focal length of the first lens group, X is a number selected from the expression 1.5≤X≤2.0 and Y is a number selected from the expression 5.5≤Y≤6.0.
2. The zoom lens according to claim 1, wherein the third lens group includes an aperture stop traveling together with the third lens group upon the magnification-varying operation.
3. The zoom lens according to claim 1, wherein the first lens group is configured of a cemented lens configured of a negative lens and a positive lens that are arranged in recited order from the object plane toward the image plane and are attached to each other.

4. The zoom lens according to claim 1, wherein the following conditional expression is satisfied, $$\nu 4n > 45 \quad (4)$$

where ν4n is an Abbe number of the negative lens included in the fourth lens group.

5. The zoom lens according to claim 4, wherein the following conditional expression is satisfied, $$\nu 4n > 55 \quad (4)'$$

6. The zoom lens according to claim 1, wherein
the third lens group includes a plurality of lenses including one or more positive lenses, and
image blur is compensated through moving one of the one or more positive lenses, serving as an image blur compensation lens, in the third lens group in a direction perpendicular to the optical axis.

7. The zoom lens according to claim 6, wherein the image blur compensation lens is arranged closest to the object plane in the third lens group.

8. The zoom lens according to claim 6, wherein the image blur compensation lens is arranged closest to the image plane in the third lens group.

9. An image pickup unit with a zoom lens and an image pickup device outputting an image pickup signal based on an optical image formed by the zoom lens, the zoom lens comprising:
a first lens group having positive refractive power;
a second lens group having negative refractive power;
a third lens group having positive refractive power; and
a fourth lens group having negative refractive power, and configured of a single negative lens or of a cemented lens configured of a positive lens and a negative lens that are arranged in recited order from object plane toward image plane and are attached to each other, the first to fourth lens groups being arranged in recited order from the object plane toward the image plane, wherein
a magnification-varying operation from wide end to telephoto end causes both the first lens group and the third lens group to travel toward the object plane and causes both the second lens group and the fourth lens group to travel along an optical axis,
a focusing operation causes the fourth lens group to travel along the optical axis, and
wherein the following first conditional expression is satisfied, $$A < (R4f + R4r)/(R4f - R4r) < B \quad (1)$$

where R4f is a radius of curvature of a most-object-sided optical surface in the fourth lens group, R4r is a radius of curvature of a most-image-sided optical surface in the fourth lens group, A is a number selected from the expression $0.7 \leq A \leq 1.0$ and B is a number selected from the expression $3.5 \leq B \leq 5$;

wherein the following second conditional expression is satisfied, $$M < f4/fw < N \quad (2)$$

where fw is a focal length of whole of the zoom lens in a condition that infinite is in focus at the wide end, f4 is a focal length of the fourth lens group, M is a number selected from the expression $-4.5 \leq M \leq -3.5$ and N is a number selected from the expression $-1.3 \leq N \leq -0.5$; and wherein the following third conditional expression is satisfied, $$X < f1/fw < Y \quad (3)$$

where f1 is a focal length of the first lens group, X is a number selected from the expression $1.5 \leq X \leq 2.0$ and Y is a number selected from the expression $5.5 \leq Y \leq 6.0$.

\* \* \* \* \*